US007135529B2

(12) United States Patent
Sullivan

(10) Patent No.: US 7,135,529 B2
(45) Date of Patent: Nov. 14, 2006

(54) GOLF BALL COMPRISING SATURATED RUBBER/IONOMER BLOCK COPOLYMERS

(75) Inventor: Michael J. Sullivan, Barrington, RI (US)

(73) Assignee: Acushnet Company, Fairhaven, MA (US)

( * ) Notice: Subject to any disclaimer, the term of this patent is extended or adjusted under 35 U.S.C. 154(b) by 180 days.

(21) Appl. No.: 10/913,481

(22) Filed: Aug. 9, 2004

(65) Prior Publication Data
US 2006/0030674 A1 Feb. 9, 2006

(51) Int. Cl.
A63B 37/00 (2006.01)
A63B 37/06 (2006.01)
C08F 293/00 (2006.01)

(52) U.S. Cl. .................. 525/294; 525/74; 525/78; 525/79; 525/90; 525/93; 525/299; 473/372; 473/373; 473/378; 473/385

(58) Field of Classification Search ............... None
See application file for complete search history.

(56) References Cited

U.S. PATENT DOCUMENTS

| | | | |
|---|---|---|---|
| 2,321,021 A | 6/1943 | Dyer, Jr. .................. 174/128.1 |
| 3,264,272 A | 8/1966 | Rees ........................ 428/36.9 |
| 3,404,134 A | 10/1968 | Rees ........................ 525/362 |
| 4,274,637 A | 6/1981 | Molitor .................. 273/235 R |
| 4,473,665 A | 9/1984 | Martini-Vvedensky et al. ............... 521/79 |
| 4,526,375 A | 7/1985 | Nakade .................. 273/235 R |
| 4,560,168 A | 12/1985 | Aoyama .................. 273/232 |
| 4,692,497 A | 9/1987 | Gendreau et al. ........... 525/263 |
| 4,884,814 A | 12/1989 | Sullivan ................. 273/235 R |
| 4,925,193 A | 5/1990 | Melvin et al. .............. 273/232 |
| 4,960,281 A | 10/1990 | Aoyama .................. 273/232 |
| 4,986,545 A | 1/1991 | Sullivan ................. 273/235 R |
| 5,006,297 A | 4/1991 | Brown et al. ............... 264/234 |
| 5,120,791 A | 6/1992 | Sullivan ................... 525/196 |
| 5,155,157 A | 10/1992 | Statz et al. ............... 524/423 |
| 5,160,674 A | 11/1992 | Colton et al. .............. 264/50 |
| 5,248,878 A | 9/1993 | Ihara ..................... 219/121.69 |
| 5,249,804 A | 10/1993 | Sanchez ................... 273/232 |
| 5,252,652 A | 10/1993 | Egashira et al. ........... 524/392 |
| 5,316,730 A | 5/1994 | Blake et al. ................ 422/73 |
| 5,321,089 A | 6/1994 | Cadorniga et al. ........ 525/196 |
| 5,324,783 A | 6/1994 | Sullivan .................. 525/196 |
| 5,334,673 A | 8/1994 | Wu ....................... 273/235 R |
| 5,359,000 A | 10/1994 | Hamada et al. ............ 525/74 |
| 5,397,840 A | 3/1995 | Sullivan et al. ............ 525/221 |
| 5,415,937 A | 5/1995 | Cadorniga et al. ......... 428/407 |
| 5,422,398 A | 6/1995 | Weiss .................... 525/178 |
| 5,484,870 A | 1/1996 | Wu ....................... 528/28 |
| 5,492,972 A | 2/1996 | Stefani ................... 525/196 |
| 5,516,847 A | 5/1996 | Sullivan et al. ........... 525/221 |
| 5,530,083 A | 6/1996 | Phelps et al. .............. 528/25 |
| 5,562,552 A | 10/1996 | Thurman .................. 473/379 |
| 5,575,477 A | 11/1996 | Hwang ..................... 473/379 |
| 5,688,181 A | 11/1997 | Albert ..................... 473/61 |
| 5,688,191 A | 11/1997 | Cavallaro et al. .......... 473/373 |
| 5,692,974 A | 12/1997 | Wu et al. .................. 473/377 |
| 5,703,166 A | 12/1997 | Rajagopalan et al. ....... 525/196 |
| 5,713,801 A | 2/1998 | Aoyama .................... 473/354 |
| 5,733,428 A | 3/1998 | Calabria et al. ........... 264/134 |
| 5,803,831 A | 9/1998 | Sullivan et al. ............ 473/374 |
| 5,820,488 A | 10/1998 | Sullivan et al. ............ 473/374 |
| 5,849,168 A | 12/1998 | Lutz ....................... 264/755 |
| 5,863,627 A | 1/1999 | Szycher et al. ........... 428/36.8 |
| 5,885,172 A | 3/1999 | Hebert et al. .............. 473/354 |
| 5,919,100 A | 7/1999 | Boehm et al. ............. 473/354 |
| 5,957,787 A | 9/1999 | Hwang ..................... 473/379 |
| 5,965,669 A | 10/1999 | Cavallaro et al. ........... 525/221 |
| 5,981,654 A | 11/1999 | Rajagopalan ............... 525/66 |
| 5,981,658 A | 11/1999 | Rajagopalan et al. ....... 525/72 |
| 6,056,842 A | 5/2000 | Dalton et al. .............. 156/243 |
| 6,075,223 A | 6/2000 | Harrison ................. 219/121.85 |
| 6,099,415 A | 8/2000 | Lutz ........................ 473/357 |
| 6,129,881 A | 10/2000 | Puniello ................... 264/278 |
| 6,149,535 A | 11/2000 | Bissonnette et al. ....... 473/354 |
| 6,180,040 B1 | 1/2001 | Ladd et al. ................ 264/248 |
| 6,180,722 B1 | 1/2001 | Dalton et al. .............. 525/193 |
| 6,192,512 B1 | 2/2001 | Chess ...................... 717/5 |
| 6,203,451 B1 | 3/2001 | Rajagopalan .............. 473/371 |
| 6,207,784 B1 | 3/2001 | Rajagopalan .............. 528/71 |
| 6,213,898 B1 | 4/2001 | Ogg ........................ 473/383 |
| 6,221,960 B1 | 4/2001 | Rajagopalan .............. 525/57 |
| 6,235,230 B1 | 5/2001 | Puniello ................... 264/278 |

(Continued)

FOREIGN PATENT DOCUMENTS

EP 0 577 058 1/1994

OTHER PUBLICATIONS

U.S. Appl. No. 10/228,311 filed Aug. 27, 2002 entitled "Golf Balls Comprising Light Stable Materials and Methods for Making Same".

(Continued)

Primary Examiner—David J. Buttner
(74) Attorney, Agent, or Firm—Bingham McCutchen LLP

(57) ABSTRACT

The invention provides golf balls with a core and with one or more layers, preferably cover layers, formed of a saturated rubber/ionomer block copolymer comprising one or more neutral thermoplastic polymer blocks and one or more ionomeric blocks. The saturated rubber block is preferably polyisobutylene, and the ionomer block may be a cationomer block or an anionomer block. Various block cationomers comprising polyisobutylene (PIB) and poly(2-dimethylamino)ethyl methacrylate) (PDMAEMA) are preferred. The golf balls of the present invention have been found to provide improved scuff resistance while providing a greater coefficient of friction for improved spin and feel properties.

17 Claims, 2 Drawing Sheets

U.S. PATENT DOCUMENTS

| | | | |
|---|---|---|---|
| 6,241,622 B1 | 6/2001 | Gobush et al. | 473/199 |
| 6,248,804 B1 | 6/2001 | Lutz | 523/160 |
| 6,286,364 B1 | 9/2001 | Aoyama et al. | 73/65.03 |
| 6,290,615 B1 | 9/2001 | Ogg | 473/378 |
| 6,315,915 B1 | 11/2001 | Hebert et al. | 216/67 |
| 6,338,684 B1 | 1/2002 | Winfield et al. | 473/378 |
| 6,358,161 B1 | 3/2002 | Aoyama | 473/383 |
| 6,379,138 B1 | 4/2002 | Puniello et al. | 425/116 |
| 6,383,092 B1 | 5/2002 | Ogg | 473/378 |
| 6,391,955 B1 | 5/2002 | Rajagopalan et al. | 524/308 |
| 6,409,615 B1 | 6/2002 | McGuire et al. | 473/383 |
| 6,414,082 B1 | 7/2002 | Rajagopalan et al. | 525/74 |
| 6,462,303 B1 | 10/2002 | Brown | 219/121.69 |
| 6,486,250 B1 | 11/2002 | Rajagopalan | 524/431 |
| 6,488,591 B1 | 12/2002 | Gobush et al. | 473/199 |
| 6,500,073 B1 | 12/2002 | Gobush et al. | 473/199 |
| 6,500,495 B1 | 12/2002 | Lutz | 427/500 |
| 6,559,226 B1 | 5/2003 | Rajagopalan | 525/57 |
| 6,559,266 B1 | 5/2003 | Kaufhold et al. | 528/76 |
| 6,942,582 B1 * | 9/2005 | Takesue et al. | 473/378 |
| 2001/0009310 A1 | 7/2001 | Hebert et al. | |
| 2001/0018375 A1 | 8/2001 | Hayashi et al. | |
| 2001/0019971 A1 | 9/2001 | Hayashi et al. | |
| 2002/0025862 A1 | 2/2002 | Sullivan et al. | |
| 2002/0028885 A1 | 3/2002 | Sullivan et al. | |
| 2002/0079615 A1 | 6/2002 | Puniello et al. | |
| 2002/0082358 A1 | 6/2002 | Ohira et al. | |
| 2003/0096936 A1 | 5/2003 | Wu et al. | |
| 2003/0106442 A1 | 6/2003 | Gosetti et al. | |
| 2003/0119989 A1 | 6/2003 | Ladd et al. | |
| 2003/0204022 A1 | 10/2003 | Kennedy et al. | |
| 2003/0212240 A1 | 11/2003 | Wu et al. | |
| 2005/0020783 A1 * | 1/2005 | Takesue et al. | 525/439 |

OTHER PUBLICATIONS

U.S. Appl. No. 10/190,705 filed Jul. 9, 2002 entitled "Low Compression, Resilient Golf Balls With Rubber Core".

U.S. Appl. No. 10/167,744 filed Jun. 13, 2002 entitled "Golf Ball With Multiple Cover Layers".

U.S. Appl. No. 10/138,304 filed May 6, 2002 entitled "Golf Ball Incorporating Grafted Metallocene Catalyzed Polymer Blends".

U.S. Appl. No. 10/078,417 filed Feb. 21, 2002 entitled "Dimple Patterns for Golf Balls".

U.S. Appl. No. 10/028,826 filed Dec. 28, 2001 entitled "Golf Ball With A Radially Oriented Transversely Isotropic Layer and Manufacture of Same".

U.S. Appl. No. 09/989,191 filed Nov. 21, 2001 entitled "Golf Ball Dimples with a Catenary Curve Profile".

U.S. Appl. No. 09/842,829 filed Apr. 27, 2001 entitled "All Rubber Golf Ball With Hoop-Stress Layer".

U.S. Appl. No. 09/841,910 filed Apr. 27, 2001 entitled "Multilayer Golf Ball With Hoop-Stress Layer".

U.S. Appl. No. 09/717,136 filed Nov. 22, 2000 entitled "Method of Making Golf Balls".

U.S. Appl. No. 09/442,845 filed Nov. 18, 1999 entitled "Mold for a Golf Ball".

* cited by examiner

GOLF BALL COMPRISING SATURATED RUBBER/IONOMER BLOCK COPOLYMERS

FIELD OF THE INVENTION

The invention relates generally to golf balls and, more specifically, to golf balls with one or more layers, preferably cover layers, formed of a polymer composition comprising a saturated rubber/ionomer block copolymer. Various block cationomers comprising polyisobutylene (PIB) and poly(2-dimethylamino)ethyl methacrylate) (PDMAEMA) are preferred.

BACKGROUND OF THE INVENTION

Conventional golf balls can be divided into two general classes: (a) wound-core golf balls and (b) solid golf balls. Wound-core golf balls with balata (trans-polyisoprene) covers were typically preferred by professional and low handicap amateur golfers prior to recent developments in solid core golf ball technology. Wound balls with balata covers provide a combination of distance, high spin rate, and control that formerly was not available with other types of golf balls, though this is no longer the case. Nevertheless, the soft balata cover is still preferred by many. However, balata is easily damaged in normal play and thus lacks the durability required by the average golfer.

Solid golf balls include balls with a solid core and usually one or more additional layers. One-piece balls are easy to construct and relatively inexpensive but have poor playing characteristics and are thus generally limited for use as driving range balls. Two-piece balls are constructed generally with a solid core, formed of a solid sphere which typically comprises a polybutadiene-based compound, and a cover, usually an ionomer composition. Ionomer resins are generally understood as thermoplastic polymers that are ionically crosslinked, and which may contain both hydrogen and ionic bonds. Ionomers are typically derived from copolymers of an olefin, e.g., ethylene, and an $\alpha,\beta$-unsaturated carboxylic acid, e.g., acrylic acid, methacrylic acid, or maleic acid, that are partially neutralized with metal ions such as sodium, lithium, zinc, or magnesium ions, as disclosed in U.S. Pat. Nos. 3,264,272 and 3,404,134. Examples of commercially available ionomer resins include, but are not limited to, SURLYN® from Dupont de Nemours and Company, and ESCOR® and IOTEK® from Exxon Corporation. These ionomer resins are distinguished by the type of metal ion, the amount of acid, and the degree of neutralization. Two piece balls with ionomer covers are generally easy to manufacture, extremely durable, have good shear resistance, and are difficult to cut. However, this durability results from the hardness of the ionomer, which gives such balls a very hard "feel" when struck, which many golfers find inferior to the softer "feel" of a balata covered ball. In addition, the hardness of the ionomer gives the balls a lower spin rate, making these balls more difficult to control. Accordingly, two piece balls are regarded by expert players as having limited playing characteristics.

Multi-layer solid golf balls include a solid core, one or more intermediate layers, and/or a cover of one or more layers. These balls are regarded as having an extended range of playing characteristics. A variety of multi-layer golf balls have been designed by manufacturers to provide a wide range of characteristics, such as durability, compression, velocity, "feel," and spin. These characteristics can be optimized for various playing abilities by modifying the types and compositions of the layers in the balls. Various polymer formulations and combinations have been prepared, largely focusing on modifying the properties of ionomer compositions by forming ionomer blends.

For example, U.S. Pat. Nos. 4,884,814, 5,120,791, 5,324,783, 5,415,937 and 5,492,972 disclose ball compositions which are blends of high-hardness ionomers and low-hardness ionomers. Other patents disclose blends of ionomers and nonionic polymers, such as U.S. Pat. Nos. 5,397,840, 5,516,847, 5,703,166. These patents attempt to overcome the inherent immiscibility of ionomers and nonionic polymers by adding polar functionalities to the nonionic polymers (see, e.g., U.S. Pat. Nos. 4,986,545 and 5,359,000), or by adding compatibilizers to provide or enhance the compatibility of the two polymer species (see, e.g., U.S. Pat. Nos. 5,155,157 and 5,321,089, and Japanese patent application 6,192,512 (1994)). Still other patents disclose blends of normally immiscible or poorly miscible non-ionomer polymers with compatibilizers (see, e.g., U.S. Pat. No. 5,422,398).

U.S. Pat. No. 4,692,497 discloses a golf ball and material thereof formed by curing a diene polymer including polybutadiene and a metal salt of an alpha, beta ethylenically unsaturated acid using at least two free radical initiators.

U.S. Pat. No. 4,526,375 discloses golf balls having improved low temperature impact resistance including a cover composition having an ionic polymer with at least two different metal ions in one molecule.

U.S. Pat. No. 5,692,974 discloses compositions using cationic polymers having positively charged quaternary ammonium groups. The cationic groups, preferably present in cationic polyurethane polymers, impart improved characteristics to golf ball covers formed therefrom.

U.S. Pat. No. 5,252,652 discloses a one-piece or multi-layered golf ball core with improved flying performance from a rubber composition comprising a base rubber, preferably 1,4-polybutadiene with a cis- content of at least 40 mole percent, an unsaturated carboxylic acid metal salt, an organic peroxide, and an organic sulfur compound and/or a metal salt thereof. The organic sulfur compound and/or a metal salt is typically present in an amount from about 0.05 to 2 parts per hundred by weight and the organic peroxide is typically present in an amount from about 0.5 to 3 parts per hundred by weight of the total polymer component.

U.S. Pat. No. 5,692,974 discloses methods of using cationic ionomers in golf ball cover compositions. Additionally, the patent relates to golf balls having covers and cores incorporating urethane ionomers. Improved resiliency and initial velocity are achieved by the addition of an alkylating agent such as t-butyl-chloride which induces ionic interactions in the polyurethane to produce cationic type ionomers.

British Patent No. 2,321,021 discloses a solid golf ball having a core and a cover formed on the core and having a two-layered cover construction having an inner cover layer and an outer cover layer. The outer cover layer is comprised of a rubber composite that contains 0.05 to 5 parts by weight of an organic sulfide compound. The core rubber composition comprises a base rubber, preferably 1,4-polybutadiene having a cis- content of at least 40 percent by weight, a crosslinking agent, a co-crosslinking agent, an organic sulfide, and a filler. The crosslinking agent is typically an organic peroxide present in an amount from 0.3 to 5.0 parts by weight and the co-crosslinking agent is typically a metal salt of an unsaturated fatty acid present in an amount from 10 to 40 parts by weight. The organic sulfide compound is typically present from 0.05 to 5 parts by weight.

European Patent No. 0 577 058 discloses a golf ball containing a core and a cover that is formed as two separate layers. The inner layer of the cover is molded over the core and is formed from ionomer resin. The outer layer of the cover is molded over the inner layer and is formed from a blend of natural or synthetic balata and a crosslinkable elastomer, such as polybutadiene. In one embodiment of the outer layer of the cover, the elastomer is 1,4-polybutadiene having a cis- structure of at least 40 percent, with the remaining 60 percent being the trans-isomer. A preferred embodiment contains a cis- structure of at least 90 percent and more preferably, a cis- structure of at least 95 percent.

Notwithstanding these efforts, there is no known prior art disclosure of the use in a golf ball of a block copolymer having a saturated rubber block and an ionomer block as provided by the present invention. It has been discovered, surprisingly, that such block copolymers have desirable hydrogen bonding or dipole interactions as well as ionic interactions which can be utilized to impart improved characteristics to golf ball cores, covers, and intermediate layers, such as improved durability and scuff resistance while obtaining a high coefficient of friction and a soft feel, thus curing deficiencies found in the prior art.

SUMMARY OF THE INVENTION

The present invention is directed to a golf ball including at least one core or layer, the core or layer further including a block copolymer ionomer having a block of a saturated rubber compound, preferably polyisobutylene, and at least one ionomeric block connected to the block of saturated rubber. The ionomer block copolymer may be included in any layer or the core of the golf ball, but preferably the ionomeric block copolymer layer is a cover layer.

In a further aspect of this embodiment, the at least one ionomeric block includes an anionomer. In an even further aspect of this embodiment, the anionomer includes an acrylic acid salt, preferably a methacrylic acid salt, even more preferably a poly(methacrylic acid) salt. In an even more preferred embodiment, the block copolymer ionomer is a polyisobutylene-block-poly(methacrylic acid) salt or a poly(methylmethacrylic acid) salt-block-polyisobutylene-block-poly(methylmethacrylic acid) salt.

In another embodiment, the golf ball includes an ionomeric block containing cationomers. Preferably, the cationomers include tertiary amines. In another aspect, the tertiary amines comprise quaternized poly (2-dimethylamino ethyl methacrylate). Preferably, the block copolymer ionomer is polyisobutylene-block-quaternized poly (2-dimethylamino ethyl methacrylate) or quaternized poly (2-dimethylamino ethyl methacrylate)-block-polyisobutylene-block-quaternized poly (2-dimethylamino ethyl methacrylate).

In a further aspect of the present invention, a golf ball is presented including at least one layer, that layer including a star polymer having: a star polymer core and at least one arm, wherein the at least one arm includes a block of a saturated rubber composition, preferably polyisobutylene, and a block of an anionomer. Preferably, the anionomer includes an acrylic acid salt. More preferably, the acrylic acid salt is a poly (methacrylic acid) salt.

A golf ball of the present invention may also contain a star polymer having a block of a saturated rubber composition, preferably polyisobutylene, and a block of a cationomer connected to the block of saturated rubber. Preferably, the cationomer includes amines. More preferably, the amines include quaternized poly (2-dimethylamino ethyl methacrylate).

DEFINITIONS

Figure 1:
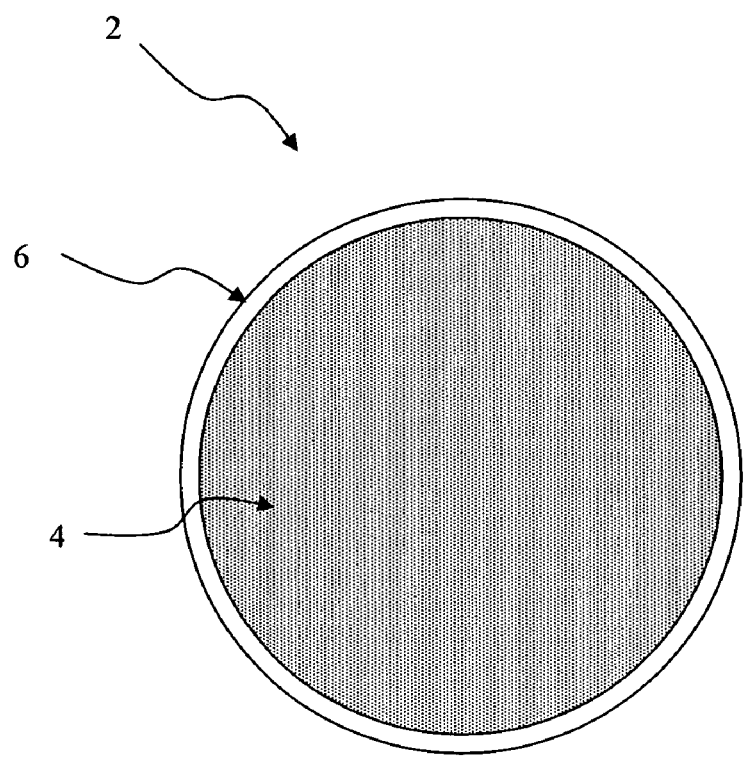
FIG. 1 is a cross-sectional view of a two-piece golf ball having a cover and a core according to the invention.

The term "about," as used herein in connection with one or more numbers or numerical ranges, should be understood to refer to all such numbers, including all numbers in a range. All number ranges should be considered to include the term "about," whether the term is present or not.

As used herein, "cis-to-trans catalyst" means any component or a combination thereof that will convert at least a portion of cis-polybutadiene isomer to trans-polybutadiene isomer at a given temperature. It should be understood that the combination of the cis- isomer, the trans-isomer, and any vinyl-isomer, measured at any given time, comprises 100 percent of the polybutadiene.

As used herein, the term "active ingredients" is defined as the specific components of a mixture or blend that are essential to the chemical reaction.

As used herein, substituted and unsubstituted "aryl" groups means a hydrocarbon ring bearing a system of conjugated double bonds, typically comprising $4n+2\pi$ ring electrons, where n is an integer. Examples of aryl groups include, but are not limited to phenyl, naphthyl, anisyl, tolyl, xylenyl and the like. According to the present invention, aryl also includes heteroaryl groups, e.g., pyrimidine or thiophene. These aryl groups may also be substituted with any number of a variety of functional groups. In addition to the functional groups described herein in connection with carbocyclic groups, functional groups on the aryl groups can include hydroxy and metal salts thereof; mercapto and metal salts thereof; halogen; amino, nitro, cyano, and amido; carboxyl including esters, acids, and metal salts thereof; silyl; acrylates and metal salts thereof; sulfonyl or sulfonamide; and phosphates and phosphites; and a combination thereof.

As used herein, the term "Atti compression" is defined as the deflection of an object or material relative to the deflection of a calibrated spring, as measured with an Atti Compression Gauge, that is commercially available from Atti Engineering Corp. of Union City, N.J. Atti compression is typically used to measure the compression of a golf ball. When the Atti Gauge is used to measure cores having a diameter of less than 1.680 inches, it should be understood that a metallic or other suitable shim is used to make the measured object 1.680 inches in diameter. However, when referring to the compression of a core, it is preferred to use a compressive load measurement. The term "compressive load" is defined as the normalized load in pounds for a 10.8-percent diametrical deflection for a spherical object having a diameter of 1.58 inches.

The term "substituted," as used herein, means one or more hydrogen atoms has been replaced by a functional group. Functional groups include, but are not limited to, hydroxyl, amino, carboxyl, sulfonic, amide, ether, ester, phosphate, thiol, nitro, silane, and halogen, as well as many others which are quite familiar to those of ordinary skill in this art.

As used herein, substituted and unsubstituted "carbocyclic" means cyclic carbon-containing compounds, including, but not limited to cyclopentyl, cyclohexyl, cycloheptyl, adamantyl, and the like. Such cyclic groups may also contain various substituents in which one or more hydrogen atoms has been replaced by a functional group. Such functional groups include those described above, and lower alkyl groups having from 1–28 carbon atoms. The cyclic groups of the invention may further comprise a heteroatom.

As used herein, the term "coefficient of restitution" for golf balls is defined as the ratio of the rebound velocity to the inbound velocity when balls are fired into a rigid plate. The inbound velocity is understood to be 125 ft/s.

As used herein, the term "dynamic stiffness" is defined as load divided by the deflection for a 1.4-mm spherical radius penetration probe oscillating at 1 Hz with an amplitude of 100 µm. The probe dynamically penetrates the surface of a sample material. Material samples of spherical cores were prepared by sectioning out a 6-mm-thick layer along the equator of core to produce a disk 6 mm thick with one surface containing the geometric center of the core. By positioning the probe at any selected radial position on the disk, a dynamic stiffness measurement may be obtained. Accurate dynamic measurements may be made by keeping the material sample at a substantially uniform temperature. The dynamic stiffness was acquired using a Dynamic Mechanical Analyzer, Model DMA 2980 available from TA Instruments Corporation of New Castle, Del. The instrument setting for the DMA 2980 were 1-Hz frequency, 100-µm amplitude, 0.3-N static load, and auto strain of 105 percent. The 1.4-mm spherical radius probe is available from TA Instruments as a penetration kit accessory to the DMA 2980. The DMA 2980 is equipped with a temperature-controlled chamber that enables testing at a wide variety of ambient temperatures.

The method and instrument utilized for measuring "dynamic stiffness" may also be used to measure loss tangent (also commonly referred to as tan δ). Loss tangent is the ratio of loss modulus to storage modulus. Loss modulus is the portion of modulus which is out of phase with displacement and storage modulus is the portion of modulus which is in phase with displacement. The DMA 2980 automatically calculates and reports loss tangent.

As used herein, the terms "Group VIA component" or "Group VIA element" mean a component that includes a sulfur component, a selenium component, or a tellurium component, or a combination thereof.

As used herein, the term "sulfur component" means a component that is elemental sulfur, polymeric sulfur, or a combination thereof. It should be further understood that "elemental sulfur" refers to the ring structure of S8 and that "polymeric sulfur" is a structure including at least one additional sulfur relative to the elemental sulfur.

As used herein, the term "fluid" includes a liquid, a paste, a gel, a gas, or any combination thereof.

As used herein, the term "molecular weight" is defined as the absolute weight average molecular weight. The molecular weight is determined by the following method: approximately 20 mg of polymer is dissolved in 10 mL of tetrahydrofuran ("THF"), which may take a few days at room temperature depending on the polymer's molecular weight and distribution. One liter of THF is filtered and degassed before being placed in a high-performance liquid chromatography ("HPLC") reservoir. The flow rate of the HPLC is set to 1 mL/min through a Viscogel column. This non-shedding, mixed bed, column model GMHHR-H, which has an ID of 7.8 mm and 300 mm long is available from Viscotek Corp. of Houston, Tex. The THF flow rate is set to 1 mL/min for at least one hour before sample analysis is begun or until stable detector baselines are achieved. During this purging of the column and detector, the internal temperature of the Viscotek TDA Model 300 triple detector should be set to 40° C. This detector is also available from Viscotek Corp. The three detectors (i.e., Refractive Index, Differential Pressure, and Light Scattering) and the column should be brought to thermal equilibrium, and the detectors should be purged and zeroed, to prepare the system for calibration according to the instructions provided with this equipment. A 100-µL aliquot of sample solution can then be injected into the equipment and the molecular weight of each sample can be calculated with the Viscotek's triple detector software. When the molecular weight of the polybutadiene material is measured, a dn/dc of 0.130 should always be used. It should be understood that this equipment and these methods provide the molecular weight numbers described and claimed herein, and that other equipment or methods will not necessarily provide equivalent values as used herein.

As used herein, the term "parts per hundred," also known as "phr," is defined as the number of parts by weight of a particular component present in a mixture, relative to 100 parts by weight of the total polymer component. Mathematically, this can be expressed as the weight of an ingredient divided by the total weight of the polymer, multiplied by a factor of 100.

As used herein, the term "substantially free" means less than about 5 weight percent, preferably less than about 3 weight percent, more preferably less than about 1 weight percent, and most preferably less than about 0.01 weight percent.

As used herein the term "resilience index" is defined as the difference in loss tangent measured at 10 cpm and 1000 cpm divided by 990 (the frequency span) multiplied by 100,000 (for normalization and unit convenience). The loss tangent is measured using an RPA 2000 manufactured by Alpha Technologies of Akron, Ohio. The RPA 2000 is set to sweep from 2.5 to 1000 cpm at a temperature of 100° C. using an arc of 0.5 degrees. An average of six loss tangent measurements were acquired at each frequency and the average is used in calculation of the resilience index. The computation of resilience index is as follows:

Resilience Index=100,000·[(loss tangent @ 10 cpm)−(loss tangent @ 1000 cpm)]/990

As used herein the term "co-initiator" as used herein, includes Friedel-Crafts acids, including, without limitation, $BCl_3$ and $TiCl_4$, which may be used in the living carbocationic polymerization process.

As used herein the term "macroinitiator" as used herein, includes a halogenated ester of the hydrophobic polymer of interest. For example, if the hydrophobic polymer of interest is, for example, PIB, the corresponding macroinitiator is PIB-OCOC($CH_3$)$_2$Br, polyisobutylene-endcapped bromoisobutyrate, abbreviated PIB-iBB. Similarly, if the hydrophobic polymer of interest is, for example, tricumyl-(polyisobutylene)$_3$, abbreviated φ[PIB]$_3$, then the corresponding macroinitiator is φ[PIB-OCOC($CH_3$)$_2$Br], abbreviated φ[PIB-iBB]$_3$.

As used herein the term "ATRP medium" includes any system of organic solvents, containing a transition metal halide catalyst, and electron donating ligand, suitable for conducting ATRP.

As used herein "neutralizable" or "dealkylable" groups refer to a hydroxyl or ether group pendent from the polymer chain and capable of being neutralized or dealkylated by a metal ion, preferably a metal ion base. These neutralized polymers have improved properties critical to golf ball performance, such as resiliency, impact strength and toughness and abrasion resistance. Suitable metal bases are ionic compounds comprising a metal cation, such as lithium, sodium, potassium, cesium, magnesium, calcium, barium, zinc, manganese, copper, and aluminum, and a basic anion, such as a carbonate, hydroxide, acetate, oxide, sulfide, and the like.

As used herein the term "acid-derivative," as used herein, includes any hydrocarbon based molecule having at least one derivatized acid residue. Likewise, as used herein the term "base-derivative," as used herein, includes any hydrocarbon based molecule having at least one derivatized base residue As used herein the term "amine" includes any hydrocarbon based molecule having at least one amine group, and preferably at least one quaternizable amine group.

The terms "alkyl" or "lower alkyl," as used herein, includes a group of from about 1 to 30 carbon atoms, preferably 1 to 10 carbon atoms. Examples of alkyl groups include lower alkyl, for example, methyl, ethyl, n-propyl, iso-propyl, n-butyl, iso-butyl or tert-butyl; upper alkyl, for example, octyl, nonyl, decyl, and the like; and lower alkylene, for example, ethylene, propylene, butylene, pentene, hexene, heptene, octene, norbornene, nonene, decene and the like. In addition, such alkyl groups may also contain various substituents in which one or more hydrogen atoms has been replaced by a functional group. Functional groups include, but are not limited to, hydroxyl, amino, carboxyl, sulfonic amide, ester, ether, phosphate, thiol, nitro, silyl, and halogen (fluorine, chlorine, bromine and iodine).

As used herein the term "block copolymer ionomer" means a block polymer comprising a first block of a saturated rubber and at least one second block containing monomers of a readily ionizable moiety, such as an acid, an acid derivative, a base, a base derivative, or an amine.

As used herein the terms "polydispersity index," "PDI," and "Mw/Mn" are used interchangeably in this disclosure and the claims that follow.

As used herein, the term "layer" includes any generally spherical portion of a golf ball, i.e., a golf ball core or center, an intermediate layer, and/or a golf ball cover.

As used herein, the term "multilayer" means at least two layers and includes liquid center balls, wound balls, hollow-center balls, and balls with at least two intermediate layers and/or an inner or outer cover.

As used herein, the term "core" means the innermost portion of a golf ball, and may include one or more layers.

As used herein, "intermediate layer" includes any layer between the innermost layer of the golf ball and the outermost layer of the golf ball. Therefore, intermediate layers may also be referred to as outer core layers, inner cover layers, and the like.

As used herein, the term "cover" means the outermost portion of a golf ball.

The term "semi-solid" as used herein refers to a paste, a gel, or the like.

DETAILED DESCRIPTION OF THE INVENTION

In one embodiment, the present invention relates to golf ball-forming compositions comprising an ionomeric block copolymer having ionic groups derived from neutralization of functional groups. The ionomeric block copolymer compositions of the present invention typically have a flexural modulus of from about 500 psi to 75,000 psi, preferably from about 2000 to 50,000 psi. The ionomeric block copolymer compositions typically have a hardness of at least about 10 Shore A, preferably between about 30 Shore A and 60 Shore D, more preferably between about 50 Shore A and 60 Shore D. The dynamic shear storage modulus, or storage modulus, of the ionomeric block copolymer compositions at about 23° C. is typically at least about 10,000 dyn/cm$^2$, preferably from about $10^4$–$10^{10}$ dyn/cm$^2$, more preferably from about $10^6$ to $10^{10}$ dyn/cm$^2$. The dynamic shear storage is defined according to ASTM Standards D4092-90, D4065-94, and D5279-93. The loss tangent, or dissipation factor, is a ratio of the loss modulus over the dynamic shear storage modulus, and is typically less than about 1, preferably less than about 0.01, and more preferably less than about 0.001 for the ionomeric block copolymer compositions measured at about 23° C. The specific gravity is typically greater than about 0.7, preferably greater than about 1, for the ionomeric block copolymer compositions.

The ionomeric block copolymers useful in the present invention include any homopolymer, copolymer or terpolymer having neutralizable functional groups, including neutralizable or dealkylable groups that are neutralized or dealkylated with a metal ion.

Figure 2:
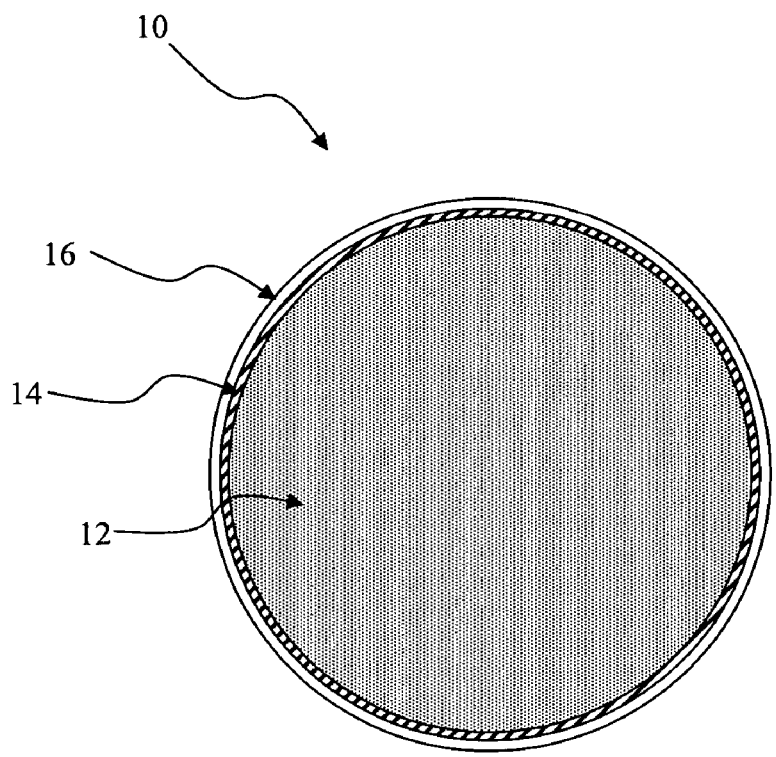
FIG. 2 is a cross-section of a golf ball having an intermediate layer between a cover and a center according to the invention.
Figure 3:
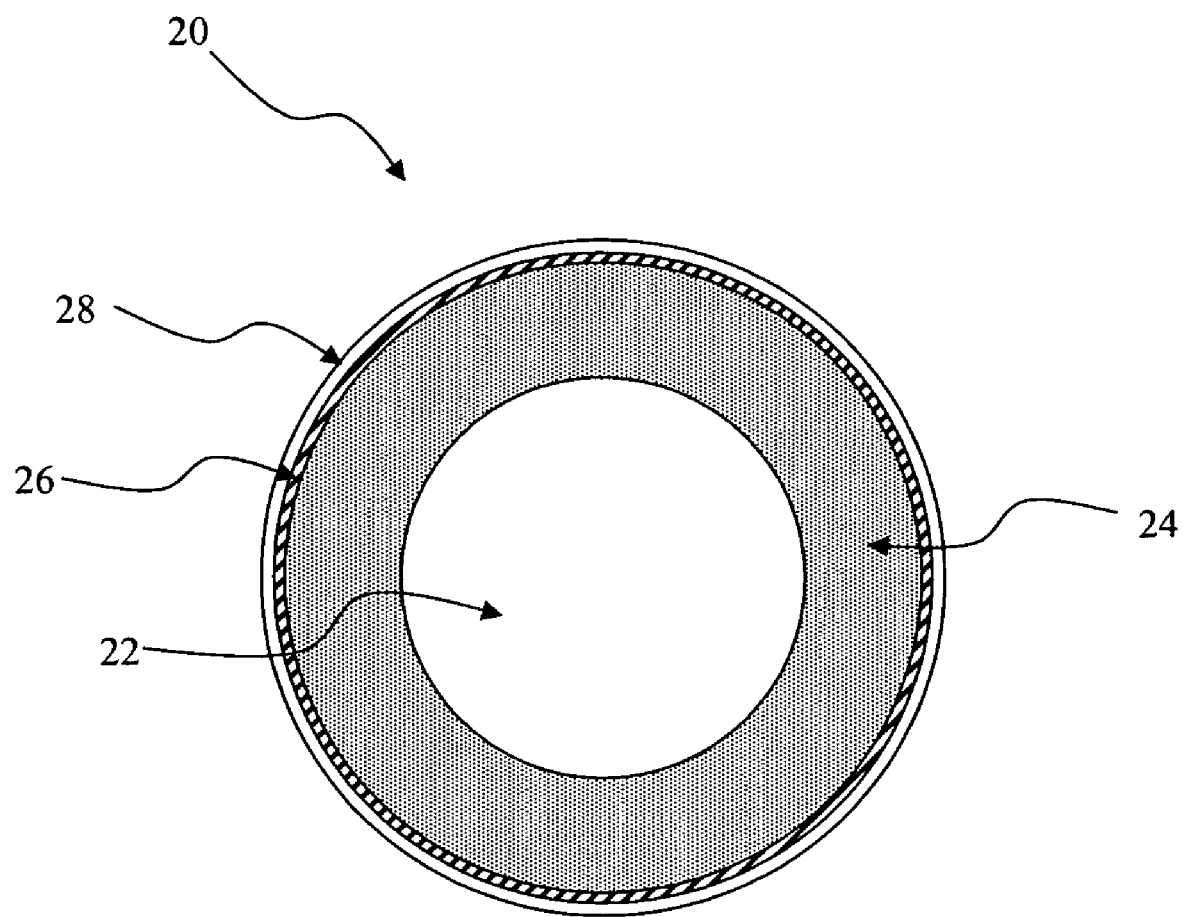
FIG. 3 is a cross-section of a golf ball having more than one intermediate layer between a cover and a center according to the invention.

The ionomeric block copolymer compositions of the present invention can be used in forming any golf ball components, i.e., the present ionomeric block copolymer compositions can be used to form at least a portion of one or more layers of the golf ball, such as the cover or a portion of the cover, the core or a portion of the core, an intermediate or mantle layer or a portion thereof, etc., and in any type of golf ball. Referring to FIG. 1, a golf ball 10 of the present invention can include a core 12, a cover 16, and optional inner cover layer 16a surrounding the core 12. Referring to FIG. 2, a golf ball 20 of the present invention can include a center 22, a cover 26, an inner cover layer 26a, and at least one intermediate layer 24 disposed between the cover and the center. Each of the cover and center may also include more than one layer; i.e., the golf ball can be a conventional three-piece wound ball, a two-piece ball, a ball having a multi-layer core or an intermediate layer or layers, etc. Thus, referring to FIG. 3, a golf ball 30 of the present invention can include a center 32, a cover 38, and intermediate layers 34 and 36 disposed between the cover and the center. Although FIG. 3 shows only two intermediate layers, it will be appreciated that any number or type of intermediate layers may be used, as desired.

In particular, two-piece golf balls 10 having a cover 16 surrounding a core 12 are within the scope of the invention, wherein the cover 16, the core 12, or both the cover 16 and the core 12 comprise the ionomeric block copolymer compositions described herein. Further, wound golf balls, in which a fluid, semi-solid, or solid or hollow core is surrounded by a tensioned elastomeric material are also contemplated as being within the scope of the present invention. Ionomeric block copolymer components can also be used in golf balls 20 or 30 having multiple cover, core, and/or intermediate layers, and may be used in any one or more of such cover, core and intermediate layers. Preferably, at least the cover comprises an ionomeric block copolymer composition of the present invention.

Ionomeric block copolymer layers may be incorporated in golf balls in accordance with the present invention by various techniques which are known in the art, as discussed in greater detail below, such as by injection molding or compression molding a layer of anionic polymer material about a previously formed center or core, cover, or intermediate layer. Cores comprising an ionomeric block copolymer composition may also be formed directly by injection molding or compression molding. When the layer or core is injection molded, a physical or chemical blowing or foaming agent may be included to produce a foamed layer, if desired. After the final cover layer of the ball has been molded, the ball usually undergoes various conventional finishing operations such as buffing, painting and stamping, all of which are well known in the art.

Broadly, the present invention is directed toward the production of golf balls comprising a composition having a structure comprising block copolymers having at least one saturated rubber block and an at least one ionomeric block, to provide thermoplastic ionomers (elastomers) having at least two blocks, or ionomeric block copolymers. Another such composition is a star polymer, having a structure comprising a first component, referred to hereinafter as a "core," or "star core," selected from the group consisting of a tri-substituted aromatic ring, for example a tricumyl group and a calixarene, connected to a plurality of second components, referred to hereinafter as "arms," comprising block copolymers wherein one segment of the copolymer comprises an isobutylene monomer and a second segment of the copolymer includes a different anionically polymerizable monomer such as, for example, tert-butyl-methacrylate (t-BMA), to provide a star polymer. It will be appreciated that since the core is a tricumyl group or a calixarene, the star polymer composition will have a plurality of polymer arms, actually more than two arms, radially extending therefrom. Hence, the term "star polymer" is used to describe these multi-arm types of compositions.

The three basic building blocks—the saturated rubber, the anionogenic monomer, and the cationogenic monomer—are exemplified by polyisobutylene (PIB), poly(methylmethacrylic acid) (PMAA), and poly (2-dimethylamino ethyl methacrylate) (PDMAEMA), respectively.

In one embodiment, the basic building block is the hydrophobic PIB moiety connected to a string of cations or anions. The string of ions connected to PIB can be either cations leading to cationomers, or anions, in which case anionomers will arise. The exemplary string of cations prepared in illustrating the practice of the present invention is a block of quaternized PDMAEMA units (PDMAEMA$^+$) and the exemplary string of anions is a block of ionized PMAA (PMAA$^-$). These ionomeric block copolymers consisting mainly of the rubbery hydrocarbon PIB and relatively lower amounts of stiff ionic domains (multiplets). Specifically, microstructures comprising a continuous PIB phase are held together by relatively small amounts (about 1 to about 30 mol %, about 3 to about 25 mol %, or about 5 to about 20 mol %, for example) of discrete ionic domains uniformly dispersed in the hydrocarbon matrix. It may be noted that, in a hydrocarbon solvent, the diblock ionomers self-assemble to inverse micelles, the triblock ionomers to "endless ionomer networks" crosslinked by discrete ionic domains, and the three-arm star ionomers to networks held together by two fundamentally different kinds of crosslinks: one originating with the three-arm star macroinitiator and the other due to the self-assembly of ionic moieties. The discrete ionic domains holding together the micelles as well as the aggregates contain cationic or anionic polymer blocks and small counterions that provide electroneutrality.

The overall synthetic strategy for the preparation of all the target ionomers, both cationomers and anionomers, consists of four major steps, exemplified by the following: 1) Preparation of desirable length saturated rubber blocks fitted with hydroxyl termini by living cationic polymerization of alkene monomers followed by end group functionalization thereof; 2) Site transformation of the hydroxyl termini to termini capable to mediate the ATRP of ionogenic monomers; 3) Effecting the ATRP of the ionogenic monomers to produce desirable length blocks attached to the saturated rubber; and 4) Completing the synthesis by producing the target ionomers, either anionomers, by hydrolyzing and neutralizing an anionogenic monomer to anionic blocks, or, cationomers, by quaternizing the cationigenic monomers to cationic blocks.

The synthesis of block ionomers may be accomplished by first synthesizing PIB through living carbocationic polymerization, allylation of the thus-created PIB, hydroboration and oxidation of the allylated PIB to form hydroxyl terminated PIB, and adding a halogenated ester to the hydrophobic polymer, to form a macroinitiator. If an anionomer is desired, the macroinitiator is atom transfer radical polymerized with an anionogenic monomer and subsequently hydrolyzed and neutralized to form an anionomer. If a cationomer is desired, the macroinitiator is atom transfer radical polymerized with a cationogenic monomer and subsequently quaternized to form a cationomer. In the final products of the present invention, either a block copolymer anionomer or a block copolymer cationomer, the ionomeric portion comprises about 1 to about 30 mol %%, about 3 to about 25 mol %, or about 5 to about 20 mol %, of the copolymer. Preferably, it comprises about 5 to about 25 mol %. Most preferably, it comprises about 15 mol %.

This synthetic strategy consists of four major steps, exemplified by the following: (1) The synthesis of multi-arm star telechelic (PIB) by living carbocationic polymerization of isobutylene (IB) followed by termination by allylation to give an allyl-terminated PIB; (2) hydroboration/oxidation to afford —OH termini; (3) Quantitative transformation of the —OH arm termini to —OCOC(CH$_3$)$_2$ Br termini to form a macroinitiator, and; (4) living controlled atom transfer radical polymerization (ATRP) of acrylonitrile mediated by the macroinitiator. It will be appreciated that the synthesis of linear diblock [AB] and triblock [ABA] copolymers is also comprehended herein. When the telechelic PIB is a monofunctional macroinitiator, then an AB block copolymer is the result. When the telechelic PB is a difunctional macroinitiator, such as a dicumyl group, then an ABA triblock copolymer is the result.

Synthesis of the block copolymers and star polymers of the present invention may be accomplished by first synthesizing PIB through living carbocationic polymerization. This carbocationic polymerization can be initiated by the addition of starting monomers, for example a stream of a isobutylene gas, to a Friedel Crafts acid, (e.g., BCl$_3$), an electron donor (e.g., dimethylacetamide (DMA)) and a proton trap (e.g., 2,5-di-tertbutylpyridine (DtBP)). A second Friedel Crafts acid, (e.g., TiCl$_4$) can then be introduced and the reactor can be cooled and agitated. To quench or terminate the polymerization, a terminating agent, such as methanol, or alllyltrimethylsilane (ATMS) may be added. The carbocationic polymerization and termination is depicted above in step 1. If ATMS is used, the polyisobutylene block is allylated, that is, a —CH$_2$—CH=CH$_2$ group is added, hence terminating the polymerization of polyisobutylene, by the formation of an allyl-terminated polyisobutylene. The allyl-terminated polyisobutylene is then hydroborated and oxidated to form hydroxyl terminated PIB. The allylation, hydroboration/oxidation, and living cationic polymerization of polyisobutylene is further described in Chen, C., J. Si, and J. Kennedy, "Living Carbocationic Polymerization XLIX: Two-Stage Living Polymerization of Isobutylene to Di-tert- Chlorine Telechelic Polyisobutylene," J. M. S.—Pure Appl. Chem., A29(8), 669 (1992), the disclosure of which is incorporated herein by reference in its entirety.

Suitable Friedel Crafts acids for the practice of the present invention include $BCl_3$ and $TiCl_4$. Suitable electron donors include but are not limited to: N,N-dimethylacetamide, (DMA); 1,1,4,7,10,10-hexamethyltriethylenetetramine, HMTETA; N,N,N,',N',N'''-pentamethyldiethylenetriamine, (PMDETA); and dipyridyl, (dpy). Most preferred is dipyridyl. Among the preferred electron pair donors suitable for the practice of the present invention are, inter alia, dimethylacetamide (DMA), dimethyl sulfoxide (DMSO), dimethylphthalate (DMP), pyridine and its derivative triethylamine (TEA), with DMA being most preferred. Examples of proton scavengers include 2,2' bipyridyl, di-tert-butylpyridine (DtBP) and its methyl derivatives with 2,2' bipyridyl being most preferred.

Next, a halogenated ester, such as 2-bromoisobutyryl bromide (BiBB) is reacted with the hydroxyl-endcapped polyisobutylene to form a macroinitiator. The macroinitiator is capable of mediating ATRP. In particular, the macroinitiator may be synthesized beginning with a hydroxyl endcapped polyisobutylene, for example, a tricumyl (hydroxyl-endcapped polyisobutylene)$_3$ or a calix[n]arene (hydroxyl endcapped polyisobutylene)$_n$, wherein n=4 to 16. This reaction is carried out in the presence of an electron donating ligand to form the macroinitiator. Next, the macroinitiator mediates ATRP of the ionogenic monomers, resulting in an ionogenic block added to each polyisobutylene block. This is known as a block copolymer anionomer precursor. The addition of an ionogenic block to a polyisobutylene block to form a narrow polydispersity polyisobutylene-block copolymer ionomer such as PIB-b-PMAA$^-$ or a star block copolymer such as $\phi$(PIB-b-PMAA$^-$)$_3$ is accomplished through atom transfer radical polymerization (ATRP), which was first discussed in the patent literature in Matyjaszewski, et al, U.S. Pat. No. 5,763,548. ATRP is a living anionic radical polymerization wherein a telechelic macroinitiator, such as $\phi$[PIB-iBB]$_3$, is placed into a solvent containing a catalyst, for example, Cu[I]Br or Cu[I]Cl, and an electron donating agent such 2,2'-bipyridyl, HMTETA, or PMDETA., or derivatives thereof. Upon adding anionically polymerizable monomers, such as DMAEMA or t-BMA, to the solution, a polymer block of the anionically polymerizable anionogenic monomers, such as PMAA, begins to grow. The anionogenic monomers include acrylic acids, which may include polyacrylic acids, or polymethacrylic acids, in particular. Preferably, in this process, the polymethacrylic acid used is poly(tert-butyl methacrylic) acid. Thus polymerized acid derivative residues are hydrolyzed in excess acid, and neutralized, and the result is a block copolymer wherein one block is saturated rubber and at least a second block is an anionomeric block.

The final ionomeric block copolymer products of the present invention may include a linear diblock, or linear triblock copolymer ionomer, or a star block copolymer ionomer. For a diblock, the initiator contains a cumyl group. For a triblock, the initiator is a dicumyl group. If the star block copolymer is only a three arm star, a tricumyl core is provided where n=4 to 16. If, on the other hand, more than three arms are to be provided, a calix[n]arene core is employed. Whether a diblock, triblock or star block copolymer ionomer, the ionomeric portion of each copolymer ionomer comprises from about 1 mol % to about 30 mol %. Preferably, it comprises from about 5 mol % to about 25 mol % of the copolymer ionomer. More preferably, it comprises about 15 mol %. Living carbocationic polymerization and atom radical transfer polymerization are known for producing well defined and uniform molecular weight polymers. Hence, the copolymer ionomers of the present invention will have Mw/Mn less than about 1.50. Preferably, Mw/Mn is less than about 1.35. Most preferably, Mw/Mn is less than about 1.25.

It will be appreciated that a tricumyl group is a trifunctional initiator for the living carbocationic polymerization reaction. Hence, three arms may extend from the tricumyl group, which accordingly serves as the core of a star polymer. In a similar manner, a calixarene derivative is a multifunctional initiator for the living carbocationic polymerization reaction, and a plurality of arms equal to the number of functional sites on the calixarene may extend from the calixarene, which serves as the core of a star polymer. Thus, where calixarene derivatives are used as initiators, the number of arms, N, will depend upon the number of functional sites, n, in the calixarene product since each one arm may bond to each functional site. It is conventional in the art to refer to the number of functional sites on a calixarene by denoting the product as calix[n]arene where n equals the number of functional sites.

Synthesis of a composition of matter via the techniques described above results in a block copolymer ionomer comprising a block of polyisobutylene and at least one ionomeric block connected to the block of polyisobutylene. In particular, the ionomeric block comprises anionomers. Examples of the anionomers include an acrylic acid salt. The acrylic acid salt may include a methacrylic acid salt. Further, the methacrylic acid salt may include a poly(methacrylic acid) salt. Specifically, the poly(methacrylic acid) salt may include. The composition of this embodiment comprises polyisobutylene-block-poly(methylmethacrylic acid) salt.

The copolymers of the present invention may include, for example, a diblock copolymer, such as PIB-b-PMAA$^-$, a triblock copolymer such as PMAA$^-$-b-PIB-b-PMAA$^-$, a star polymer comprising a core component containing a tricumyl group, such as $\phi$-(-(PIB-b-PMAA$^-$)$_3$, or a calix[n]arene where n=4 to 16, such as calix[8]arene (PIB-b-PDMAEMA$^+$)$_8$. Generally, the star polymer has a plurality of arms connected to the core component.

The star polymers in golf balls of the present invention have a core and at least one arm. The arms comprise a polyisobutylene block and an anionomeric block. The anionomeric block comprises an acrylic acid salt. The acrylic acid salt may include a methacrylic acid salt. Further, the methacrylic acid salt may include a poly(methacrylic acid) salt. The final product of this embodiment comprises a tricumyl [polyisobutylene-block-poly(methylmethacrylic acid) salt]$_3$ or a calix[n]arene-[polyisobutylene-block-poly(methylmethacrylic acid) salt]$_n$ wherein n=4 to 16. Clearly, then, a star polymer of this embodiment may include from 3 to 16 arms. Each arm comprises from about 75 mol % to about 95 mol % polyisobutylene and from about 25 mol % to about 5 mol % poly (methacrylic acid) salt.

With regard to the star polymers, where there are 3 arms, the core component contains a tricumyl group, and where there are more than 3 arms the core component contains a calix[n]arene; with n being to equal the number arms. Each arm comprises one polyisobutylene block directly connected to the core component, while an ionogenic block is connected to the polyisobutylene block to form a copolymer arm.

In the present invention, the tert-halo, tert-methoxy, tert-hydroxy, and tert-acetate derivatives of tricumyl groups and calix[n]arenes where n=4 to 16 are preferably used as multifunctional initiators. That is, the multifunctional initiators suitable for use according to the concepts of the present invention are preferably, but not limited to the tert-F, tert-Cl, tert-Br, tert-I, tert-OCH$_3$, tert-OH, and tert-CH$_3$COO$^-$ derivatives of a tricumyl group and the tert-F, tert-Cl, tert-Br, tert-I, tert-OCH$_3$, tert-OH, and tert-CH$_3$COO$^-$ derivatives of calix[n]arene where n=4 to 16.

Hence, in the above calix[n]arene initiator, y=1, n=4 to 16, and R$_1$ is selected from —F, —Cl, —Br, —I, —OCH$_3$, —OH, and CH$_3$COO$^-$. Similarly, in the above tricumyl initiator, R$_2$ is selected from —F, —Cl, —Br, —I, —OCH$_3$, —OH, and CH$_3$COO$^-$. The tert-methoxy, tert-hydroxy, and tert-Cl derivatives of calix[n]arenes where n=4 to 16 are preferred. More preferred are the tert-methoxy, tert-hydroxy, and tert-Cl derivatives of calix[8]arene. Of the three specified derivatives, the tert-methoxy derivative of calix[8]arene is more preferable because it is soluble in polyisobutylene cationic polymerization charges (CH$_3$Cl/hexanes) at −80° C. In general, preferred multifunctional (octafunctional) initiators suitable for use in the present invention are octa-arm calix arene derivatives, such as octa-arm (polyisobutylene-isobutyryl bromide)$_8$, resulting in an octa arm calix[8]arene (polyisobutylene-polyacrylonitrile)$_8$ as the final star block copolymer. Specific preferred examples of multifunctional (octafunctional) initiators suitable for use in the present invention are the tert-methoxy, tert-hydroxy, and tert-Cl derivatives of 5,11,17,23,29,35,41,47-octaacetyl-49,50,51, 52,53,54,55,56-octamethoxycalix[8]arene, namely 5,11,17, 23,29,35,41,47-(2-hydroxypropyl)-49,50,51,52,53,54,55, 56-octamethoxycalix[8]arene and 5,11,17,23,29,35,41,47-(2-methoxypropyl)-49,50,51,52,53,54,55,56-octamethoxycalix[8]arene. An even more preferred core, however, is a tricumyl group. The most preferred core is a tricumyl chloride initiator, i.e., where R$_2$ is —Cl.

The rubber used in ionomeric block copolymers usable in the present invention may be any saturated rubber that is known in the art. Examples include, but are not limited to, polyisobutylene (PIB), ethylene-propylene rubber (EPR), silicone rubber, thiokol rubbers, and tetrahydrofuran (THF) rubbers, polyisoprene (IR/NR), polychloroprene (CR), polyacrylic rubber (ACM), and chlorosulfonated polyethylene (CM). Most preferred is polyisobutylene rubber.

The anionomer may be any carboxylic acid having from 2 to 12 carbons, which does not contain nitrogen. The carboxylic acid residue may contain straight alkyl chains and/or aromatic groups. Examples include, but are not limited to, acrylic acids and methacrylic acids, for example, (meth)acrylic acid esters such as methyl (meth)acrylic acid, ethyl (meth)acrylic acid, n-propyl (meth)acrylic acid, n-butyl (meth)acrylic acid, tert-butyl methacrylic acid (t-BMA), isopropyl (meth)acrylic acid, isobutyl (meth)acrylic acid, n-hexyl (meth)acrylic acid, 2-hydroxyethyl (meth)acrylic acid, 2-hydroxypropyl (meth)acrylic acid, 2-sulfoethyl (meth)acrylic acid, trifluoroethyl (meth)acrylic acid, glycidyl (meth)acrylic acid, benzyl (meth)acrylic acid, allyl (meth)acrylic acid, 2-n-butoxyethyl (meth)acrylic acid, 2-chloroethyl(meth)acrylic acid, sec-butyl-(meth)acrylic acid, tert-butyl (meth)acrylic acid, 2-ethylbutyl(meth) acrylic acid, cinnamyl (meth)acrylic acid, crotyl (meth) acrylic acid, cyclohexyl (meth)acrylic acid, cyclopentyl (meth)acrylic acid, 2-ethoxyethyl (meth)acrylic acid, furfuryl (meth)acrylic acid, hexafluoroisopropyl (meth)acrylic acid, methallyl (meth)acrylic acid, 3-methoxybutyl (meth) acrylic acid, 2-methoxybutyl (meth)acrylic acid, n-octyl (meth)acrylic acid, 2-ethylhexyl (meth)acrylic acid, lauryl (meth)acrylic acid, 2-phenoxyethyl (meth)acrylic acid, 2-phenylethyl (meth)acrylic acid, phenyl (meth)acrylic acid, propargyl (meth)acrylic acid, tetrahydrofurfuryl (meth) acrylic acid, norbornyl (meth)acrylic acid, tetrahydropyranyl (meth)acrylic acid, vinyl acetate, vinyl propionate, vinylidene chloride, and acrylic and methacrylic acids. It is to be understood that by "(meth)acrylic acid" is meant both the acrylic acid and the corresponding methacrylic acid as enumerated hereinabove. The most preferred acid-derivative is t-BMA.

Hence, the block copolymer ionomers produced by this embodiment of the present invention may include a block of polyisobutylene and at least one anionomeric block. An anionomeric may be an acid derivative block, attached to the polyisobutylene block. Block copolymer anionomers and star block copolymer anionomers which may result from the practice of the present invention may include PIB-b-PMAA$^-$, PIB-b-(PMAA$^-$)$_2$, φ-(PIB-b-PMAA$^-$)$_3$, and calix [n]arene-(PIB-b-PMAA$^-$)$_n$, where n=4 to 16.

The solvent used in ATRP is very important, inasmuch as it has a profound effect on the rate of conversion and the polydispersity of the thus formed block anionomer. Typical solvents are polar organic solvents, including, but not limited to benzene, anisole, toluene, o-xylene, THF and derivatives of each and mixtures thereof. More preferred is anisole. Most preferred is a mixture of anisole and toluene.

ATRP also requires the use of a catalyst. Typically the catalyst acts as a carrier of a halogen atom in a redox process, which forms part of the ATRP. One critical feature of ATRP is maintaining a halide ion at the terminal end of the growing polymer chain. Suitable catalysts include but are not limited to halides of copper, CuX, such as CuBr and CuCl. Most preferred is CuCl.

In conjunction with the catalyst, a ligand is used, which acts as an electron donor in the redox process. Ligands suitable for use as an electron donor in ATRP include, but are not limited to: HMTETA, 1,1,4,7,10,10-hexamethyltriethylenetetramine; PMDETA, N,N,N',N',N''-pentamethyldiethylenetriamine, and biPy (bipyridine). Most preferred is PMDETA.

Another parameter is the ratio of macroinitiator to ligand. Typically, the ratio of macroinitiator to ligand, for example the ratio of PIB-iBB to PMDETA may range from about 10:1 to 1:10. Preferably, this ratio is from about 5:1 to about 1:5. When producing diblock copolymer ionomers, this ratio is most preferably about 1 to 2, that is, PIB-iBB/PMDETA, w/w=1:2. However, when producing triblocks, this ratio is most preferably about 1:4.

The hydrolysis of the acid derivative group is as follows. Any inorganic mono-, di- or tri-protic acid may be used to effect the hydrolysis. Suitable acids for hydrolysis include sulfuric, hydrochloric, nitric, phosphoric. Most preferred is hydrochloric acid, HCl. The hydrolysis must be carried out with an excess of acid, with respect to the moles of the acid derivative-functionalized saturated rubber. Preferably, the acid is present in a two (2)-fold or greater molar excess. More preferably, the acid is present in a five (5)-fold or greater molar excess. Most preferably, the acid is present in a ten (10)-fold or greater molar excess.

The hydrolysis may be carried out in an organic solvent. Typical organic solvents in which to perform the hydrolysis include, benzene, toluene, xylene, anisole, hexane, cyclohexane, cyclohexanone, THF, CH$_3$Cl, CH$_3$Br, or 1,4 dioxane. Preferably, the solvent is a mixture of CH$_3$Cl and 1,4 dioxane. More preferably, the ratio of CH$_3$Cl to 1,4 dioxane is from about 5:1 to 1:5. Even more preferably, the ratio of CH$_3$Cl to 1,4 dioxane is from about 3:1 to 1:3. Most preferably, the ratio of CH$_3$Cl to 1,4 dioxane is about 2:1 (v/v).

The metal ions used as counterions to the acid derivative residues include Fe[II], Ni[I], and Cu[I].

In a second embodiment, which is similar to the first, the ionogenic group added is instead cationogenic. The rubber-macroinitiator undergoes ATRP, the process of which adds monomers of an cationogenic group in the presence of a ligand and a CuX catalyst in an ATRP medium, to give a block copolymer comprising a saturated rubber block and a cationogenic block. The cationogenic block is then quaternized with a quaternizing agent, resulting in a block copolymer ionomer wherein one block is saturated rubber and at least a second is a cationomeric block. Hence, the block copolymer cationomers produced by this embodiment of the present invention may include a block of polyisobutylene and at least one cationomeric block. A cationomeric block may be an amine block, attached to the polyisobutylene block. The amines suitable for the practice of the present invention include tertiary amines, such as 2-(dimethylamino) ethyl methacrylate. Block copolymer cationomers and star block copolymer cationomers which may result from the practice of the present invention may include quaternized (PIB-b-PDMAEMA$^+$), quaternized PIB-(b-PDMAEMA$^+$)$_2$, quaternized φ-(PIB-b-PDMAEMA$^+$)$_3$, and quaternized calix[n]arene-(PIB-b-PDMAEMA$^+$)$_n$, where n=4 to 16. An example of the second synthetic pathway is depicted below. Hence, a star block copolymer cationomer produced by the practice of the present invention comprises a core and 3 to 16 arms. The arms comprise a block of polyisobutylene and a block of a cationomer connected to the block of polyisobutylene. The cationomers comprise amines. The amines may be quaternized with a quaternizing agent. In a preferred embodiment, the star polymers of the present invention will have arms comprising 75 mol % to about 95 mol % polyisobutylene and from about 25 mol % to about 5 mol % quaternized poly (2-dimethylamino ethyl methacrylate).

Another embodiment of the present invention is prepared using the synthesis of a block copolymer cationomer. The block copolymer cationomer comprises a block of polyisobutylene and at least one block of a cationomer. The rubber used may be any saturated rubber as known in the art. Examples include, but are not limited to, polyisobutylene (PIB), ethylene-propylene rubber (EPR), silicone rubber, thiokol rubbers, and tetrahydrofuran (THF) rubbers. Most preferred is polyisobutylene rubber.

The cationomer may be an amine, which is a quaternizable amine, and as such may include tertiary amines. Suitable tertiary amines include: t-butylaminoethyl (meth)acrylate, 2-dimethylamino ethyl methacrylate (DMAEMA). More preferred are acid derivative amines. Most preferred is DMAEMA.

Suitable as quaternizing agents are small highly polar molecules containing a halide, such as alkyl halides having from 1 to 5 carbons, aryl halides having one aromatic ring, for example methyl chloride, methyl bromide, methyl iodide, ethyl chloride, ethyl bromide, ethyl iodide, benzyl chloride, chloroacetic acid and derivatives thereof, bromoacetic acid and derivatives thereof, and iodoacetic acid and derivatives thereof. More preferred are methyl chloride, methyl bromide, methyl iodide, ethyl chloride, ethyl bromide, and ethyl iodide. Most preferred is methyl iodide ($CH_3I$).

The solvent used in the ATRP medium is very important, inasmuch as it has a profound effect on the rate of conversion and the polydispersity of the thus formed block cationomer. Typical solvents are polar organic solvents, including, but not limited to o-dichlorobenzene, anisole, toluene, o-xylene, THF, derivatives thereof and mixtures thereof. A mixture of anisole and toluene preferred. More preferred is a mixture of anisole and toluene in a ratio from about 3:1 (v/v) to 1:3 (v/v). Most preferred is a one-to-one mixture of anisole and toluene (v/v=1/1).

The ATRP process requires the use of a catalyst. Typically the catalyst acts as a carrier of a halogen atom in a redox process, which is part of the ATRP. One critical feature of ATRP is maintaining a halide ion at the terminal end of the growing polymer chain. Suitable catalysts include but are not limited to halides of copper, CuX, such as CuBr and CuCl. Most preferred is CuCl.

In conjunction with the catalyst, a ligand is used, which acts as an electron donor. Ligands suitable for use as an electron donor in ATRP include, but are not limited to: HMTETA, 1,1,4,7,10,10-hexamethyltriethyl-enetetramine; PMDETA, N,N,N',N',N"-pentamethyldiethylenetriamine, and biPy, bipyridine. Most preferred is PMDETA.

An even further parameter is the ratio of macroinitiator to ligand. Typically, the ratio of macroinitiator to ligand, for example the ratio of PIB-iBB to PMDETA may range from about 10:1 to 1:10. Preferably, this ratio is from about 5:1 to about 1:5. When producing diblock copolymer ionomers, this ratio is most preferably about 1 to 2, that is, PIB-iBB/PMDETA, w/w=1:2. However, when producing triblocks, this ratio is most preferably about 1:4.

The composition of any golf ball component that does not contain the ionomer block copolymer compositions disclosed herein can be any such composition known to those of ordinary skill in the art. Such compositions may be readily selected by those of ordinary skill in the art, for example, from one of the many U.S. Patents assigned to Acushnet Company.

Further discussion of ionomeric block copolymers and their preparation may be found in U.S. Patent Application Publication No. 2003/0204022 A1 to Kennedy and Fang, the disclosure of which is incorporated herein be reference in its entirety.

Additives

The composition of any golf ball component that do not contain the ionomeric block copolymer components of the present invention disclosed herein can be any such composition known to and readily selected by those of ordinary skill in the art.

Further compositions may also be added to the ionomeric block copolymer components of the invention, such as, for example, coloring agents, reaction enhancers, crosslinking agents, blowing agents, dyes, lubricants, fillers (including density modifying fillers), excipients, process aids and other compounds commonly added to polymeric materials and/or golf ball compositions.

For example, fillers may be added to the compositions of the invention to affect rheological and mixing properties, the specific gravity, i.e., density-modifying fillers, the modulus, the tear strength, reinforcement, and the like. The fillers are generally inorganic, and suitable fillers include numerous metals or metal oxides, such as zinc oxide and tin oxide, as well as barium sulfate, zinc sulfate, calcium carbonate, barium carbonate, clay, tungsten, tungsten carbide, an array of silicas, regrind (recycled core material typically ground to about 30 mesh particle), high-Mooney-viscosity rubber regrind, and mixtures thereof. Fillers may also include various foaming agents or blowing agents which may be readily selected by one of ordinary skill in the art. Polymeric, ceramic, metal, and glass microspheres may be solid or hollow, and filled or unfilled. Fillers are typically also added to one or more portions of the golf ball to modify the density thereof to conform to uniform golf ball standards. Fillers may also be used to modify the weight of the center or at least one additional layer for specialty balls, e.g., a lower weight ball is preferred for a player having a low swing speed.

In one embodiment, the compositions of the invention can be reinforced by blending with a wide range of density-adjusting fillers, e.g., ceramics, glass spheres (solid or hollow, and filled or unfilled), and fibers, inorganic particles, and metal particles, such as metal flakes, metallic powders, oxides, and derivatives thereof, as is known to those with skill in the art. The selection of such filler(s) is dependent upon the type of golf ball desired, i.e., one-piece, two-piece, multi-component, or wound, as will be more fully detailed below. In another embodiment, the filler will be inorganic, having a density of greater than 4 g/cc, and will be present in amounts between about 5 and about 65, about 10 to about 60, about 20 to about 50, or about 30 to about 45 weight percent based on the total weight of the polymer composition.

The compositions of the invention may also be foamed by the addition of the at least one physical or chemical blowing or foaming agent. The use of a foamed polymer allows the golf ball designer to adjust the density or mass distribution of the ball to adjust the angular moment of inertia, and, thus, the spin rate and performance of the ball. Foamed materials also offer a potential cost savings due to the reduced use of polymeric material. As used herein, the term "foamed" encompasses "conventional foamed" materials that have cells with an average diameter of greater than 100 µm and "microcellular" type materials, i.e. cells with an average diameter from about 0.1 to 100 µm, so that about 5 to about 30 percent void fractions and void sizes on the order of 8 µm or less have been produced. Examples of conventional foamed materials include those described in U.S. Pat. No. 4,274,637. Examples of microcellular closed cell foams include those foams disclosed in U.S. Pat. No. 4,473,665 and U.S. Pat. No. 5,160,674. In this embodiment, the ionomeric block copolymer or copolymer blend may be foamed during molding by any conventional foaming or blowing agent. Preferably, foamed layers incorporating an oxa ester or oxa ester blend have a flexural modulus of at least about 1,000 psi to about 150,000 psi, about 3,000 psi to about 120,000 psi, or about 5,000 psi to about 100,000 psi.

Useful blowing or foaming agents include, but are not limited to, organic blowing agents, such as azobisformamide; azobisisobutyronitrile; diazoaminobenzene; N,N-dimethyl-N,N-dinitroso terephthalamide; N,N-dinitrosopentamethylene-tetramine; benzenesulfonyl-hydrazide; benzene-1,3-disulfonyl hydrazide; 4,4'-oxybis benzene sulfonyl hydrazide; p-toluene sulfonyl semicarbizide; barium azodicarboxylate; butylamine nitrile; nitroureas; trihydrazino triazine; peroxides; and inorganic blowing agents such as ammonium bicarbonate and sodium bicarbonate. A gas, such as air, nitrogen, carbon dioxide, and the like, may also be injected into the composition during the injection molding process.

A foamed composition of the present invention may also be formed by blending microspheres with the composition either during or before the molding process. Polymeric, ceramic, metal, and glass microspheres are useful in the invention, and may be solid or hollow and filled or unfilled. In particular, microspheres up to about 1000 micrometers in diameter are useful. Generally, either injection molding or compression molding may be used to form a layer or a core including a foamed polymeric material.

A free-radical source, often alternatively referred to as a free-radical initiator, is required in certain embodiments of the present invention. The free-radical source is typically a peroxide, and preferably an organic peroxide. Suitable free-radical sources include di-t-amyl peroxide, di(2-t-butyl-peroxyisopropyl)benzene peroxide, 1,1-bis(t-butylperoxy)-3,3,5-trimethylcyclohexane, dicumyl peroxide, di-t-butyl peroxide, 2,5-di-(t-butylperoxy)-2,5-dimethyl hexane, n-butyl-4,4-bis(t-butylperoxy)valerate, lauryl peroxide, benzoyl peroxide, t-butyl hydroperoxide, and the like, and any mixture thereof. The peroxide is typically present in an amount greater than about 0.1 parts per hundred of the total resilient polymer component, preferably about 0.1 to 15 parts per hundred of the resilient polymer component, and more preferably about 0.2 to 5 parts per hundred of the total resilient polymer component. It should be understood by those of ordinary skill in the art that the presence of certain cis-to-trans catalysts according to the invention may require a larger amount of free-radical source, such as the amounts described herein, compared to conventional cross-linking reactions. The free radical source may alternatively or additionally be one or more of an electron beam, UV or gamma radiation, x-rays, or any other high energy radiation source capable of generating free radicals. It should be further understood that heat often facilitates initiation of the generation of free radicals.

Crosslinkers are included to increase the hardness of the reaction product. Suitable crosslinking agents include one or more metallic salts of unsaturated fatty acids or monocarboxylic acids, such as zinc, calcium, or magnesium acrylate salts, and the like, and mixtures thereof. Preferred acrylates include zinc acrylate, zinc diacrylate, zinc methacrylate, and zinc dimethacrylate, and mixtures thereof. The crosslinking agent must be present in an amount sufficient to crosslink a portion of the chains of polymers in the resilient polymer component. For example, the desired compression may be obtained by adjusting the amount of crosslinking. This may be achieved, for example, by altering the type and amount of crosslinking agent, a method well-known to those of ordinary skill in the art. The crosslinking agent is typically present in an amount greater than about 0.1 percent of the resilient polymer component, preferably from about 10 to 40 percent of the resilient polymer component, more preferably from about 10 to 30 percent of the resilient polymer component. When an organosulfur is selected as the cis-to-trans catalyst, zinc diacrylate may be selected as the crosslinking agent and is present in an amount of less than about 25 phr.

Other materials conventionally included in golf ball compositions may also be added to the compositions of the invention. These additional materials include, but are not limited to, reaction enhancers, crosslinking agents, optical brighteners, coloring agents, fluorescent agents, whitening agents, UV absorbers, hindered amine light stabilizers, defoaming agents, processing aids, mica, talc, nano-fillers, and other conventional additives. Antioxidants, stabilizers, softening agents, plasticizers, including internal and external plasticizers, impact modifiers, foaming agents, excipients, reinforcing materials and compatibilizers may also be added to any composition of the invention. In addition, heat stabilizers may be beneficial in enlarging the range of processing temperatures to greater than about 130° C. All of these materials, which are well known in the art, are added for their usual purpose in typical amounts.

The present golf ball can likewise include one or more homopolymeric or copolymeric intermediate materials, such as:

(1) Vinyl resins, such as those formed by the polymerization of vinyl chloride, or by the copolymerization of vinyl chloride with vinyl acetate, acrylic esters or vinylidene chloride;

(2) Polyolefins, such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid and copolymers and homopolymers produced using a single-site catalyst or a metallocene catalyst;

(3) Polyurethanes, such as those prepared from polyols and diisocyanates or polyisocyanates and those disclosed in U.S. Pat. No. 5,334,673;

(4) Polyureas, such as those disclosed in U.S. Pat. No. 5,484,870;

(5) Polyamides, such as poly(hexamethylene adipamide) and others prepared from diamines and dibasic acids, as well as those from amino acids such as poly(caprolactam), and blends of polyamides with SURLYN™, polyethylene, ethylene copolymers, ethyl-propylene-non-conjugated diene terpolymer, and the like;

(6) Acrylic resins and blends of these resins with poly vinyl chloride, elastomers, and the like;

(7) Thermoplastics, such as urethanes; olefinic thermoplastic rubbers, such as blends of polyolefins with ethylene-propylene-non-conjugated diene terpolymer; block copolymers of styrene and butadiene, isoprene or ethylene-butylene rubber; or copoly(ether-amide), such as PEBAX™, sold by ELF Atochem of Philadelphia, Pa.;

(8) Polyphenylene oxide resins or blends of polyphenylene oxide with high impact polystyrene as sold under the trademark NORYL™ by General Electric Company of Pittsfield, Mass.;

(9) Thermoplastic polyesters, such as polyethylene terephthalate, polybutylene terephthalate, polyethylene terephthalate/glycol modified and elastomers sold under the trademarks HYTREL™ by E.I. Dupont de Nemours & Co. of Wilmington, Del., and LOMOD™ by General Electric Company of Pittsfield, Mass.;

(10) Blends and alloys, including polycarbonate with acrylonitrile butadiene styrene, polybutylene terephthalate, polyethylene terephthalate, styrene maleic anhydride, polyethylene, elastomers, and the like, and polyvinyl chloride with acrylonitrile butadiene styrene or ethylene vinyl acetate or other elastomers; and

(11) Blends of thermoplastic rubbers with polyethylene, propylene, polyacetal, nylon, polyesters, cellulose esters, and the like.

The polymers, free-radical initiator, filler(s), and any other materials used in forming either the golf ball center or any portion of the core, in accordance with invention, may be combined to form a mixture by any type of mixing known to one of ordinary skill in the art. Suitable types of mixing include single pass and multi-pass mixing, and the like. The crosslinking agent, and any other optional additives used to modify the characteristics of the golf ball center or additional layer(s), may similarly be combined by any type of mixing. A single-pass mixing process where ingredients are added sequentially is preferred, as this type of mixing tends to increase efficiency and reduce costs for the process. The preferred mixing cycle is single step wherein the polymer, cis-trans catalyst, filler, zinc diacrylate, and peroxide are added sequentially. Suitable mixing equipment is well known to those of ordinary skill in the art, and such equipment may include a Banbury mixer, a two-roll mill, or a twin screw extruder. Conventional mixing speeds for combining polymers are typically used, although the speed must be high enough to impart substantially uniform dispersion of the constituents. On the other hand, the speed should not be too high, as high mixing speeds tend to break down the polymers being mixed and particularly may undesirably decrease the molecular weight of the resilient polymer component. The speed should thus be low enough to avoid high shear, which may result in loss of desirably high molecular weight portions of the polymer component. Also, too high a mixing speed may undesirably result in creation of enough heat to initiate the crosslinking before the preforms are shaped and assembled around a core. The mixing temperature depends upon the type of polymer components, and more importantly, on the type of free-radical initiator. For example, when using di(2-t-butyl-peroxyisopropyl)benzene as the free-radical initiator, a mixing temperature of about 80° C. to 125° C., preferably about 88° C. to 110° C., and more preferably about 90° C. to 100° C., is suitable to safely mix the ingredients. Additionally, it is important to maintain a mixing temperature below the peroxide decomposition temperature. For example, if dicumyl peroxide is selected as the peroxide, the temperature should not exceed 200° F. Suitable mixing speeds and temperatures are well-known to those of ordinary skill in the art, or may be readily determined without undue experimentation.

Surface-modifying end groups are surface-active oligomers bonded to the base polymer during synthesis. SMEs, that include silicone, sulfonate, flurocarbon, polyethylene oxide and hydrocarbon groups, control surface chemistry without compromising the bulk properties of the polymer. Key surface properties, such as abrasion resistance, are permanently enhanced without the additional post-fabrication treatments or topical coatings. The addition of SMEs provides a series of base polymers that can actually achieve a desired surface chemistry without the use of additives. This leaves the original polymer backbone intact so that the polymer retains strength and processing ability. Having all the polymer chains carrying the surface-modifying moiety eliminates many of the potential problems associated with additives.

Composition Blends

The ionomeric block copolymers of the present invention may also be blended with other polymers. Thus, the ionomer block copolymer compositions of the present invention can comprise compatible blends of at least one ionomeric block copolymer as described above and one or more additional polymers. Blends of two or more ionomeric block copolymer compositions described above are also included within the scope of the present invention. Such blends can be formed using blending methods well known in the art. For example, the ionomeric block copolymers may be blended with saponified polymers and graft copolymers of saponified polymers, such as those disclosed in U.S. Pat. No. 6,486,250, which is incorporated in its entirety by reference herein. In addition, ionomer blends arising from combinations of anionomers with cationomers fall within the scope of the present invention. In these blends the ionic domains may consist of ion pairs of polymeric cations electrically neutralized by polymeric anions dispersed in the block copolymer matrix. A discussion of polymers suitable for blending, and blending methods, may be found in U.S. Pat. Nos. 6,221,960, 6559,266, and 6,203,451 to Rajagopalan, the contents of which are incorporated herein in their entirety.

In addition, the ionomeric block copolymers may be blended with oxa esters and oxa acids, such as those disclosed in U.S. Pat. No. 6,391,955, the disclosure of which is entirely incorporated by reference herein. The ionomeric block copolymers blends may be prepared with or without the addition of a compatibilizer, and with varying molecular architecture of blend components, such as varying molecular weight, tacticity, and degrees of blockiness, as is well known to those knowledgeable in the art of blending polymers.

Other polymers that may be used in conjunction with the ionomeric block copolymers of the invention include, but are not limited to: block copolymers of a poly(ether-ester), such as HYTREL® available from DuPont, block copolymers of a poly(ether-amide), such as PEBAX® available from Elf Atofina, styrene-butadiene-styrene block copolymers, such as the KRATON D® grades available from Kraton Polymers, styrene-(ethylene-propylene)-styrene or styrene-(ethylene-butylene)-styrene block copolymers, such as the KRATON G® series from Kraton Chemical, either of the KRATON®s with maleic anhydride or sulfonic graft or functionality, such as the KRATON FD® or KRATON FG® series available from Kraton Polymers, olefinic copolymers, such as the ethylene-acrylate or ethylene methacrylate series available from Quantum, metallocene catalyzed polymers, including ethylene-octene copolymers made from metallocene catalysts, available as the AFFINITY® or ENGAGE® series from Dow, and ethylene-alpha olefin copolymers and terpolymers made from metallocene catalysts, available as the EXACT® series from Exxon, block poly(urethane-ester) or block poly(urethane-ether) or block poly(urethane-caprolactone), such as the ESTANE® series available from Noveon Co., polyethylene glycol, such as CARBOWAX® available from Union Carbide, polycaprolactone, polycaprolactam, polyesters, such as EKTAR® available from Eastman, polyamides, such as nylon 6 or nylon 6,6, available from DuPont and ICI, ethylene-propylene-(diene monomer) terpolymers and their sulfonated or carboxylated derivatives, PP/EPDM and dynamically vulcanized rubbers, such as SANTOPRENE® from Monsanto, and FUSABOND® series materials available from DuPont. For example, the metallocene-catalyzed polymers disclosed in U.S. Pat. No. 6,414,082 are contemplated for use in conjunction with the ionomeric block copolymers of the invention.

The ionomeric block copolymer blends can comprise compatible blends of ionomeric block copolymer and thermoplastic silicone-polyether urethane copolymers. Thermoplastic silicone-polyether urethane copolymers available today include PurSil®; silicone-polycarbonate urethane copolymers available include CarboSil®; and silicone-polyethylene oxide urethane copolymers include Hydrosil®. U.S. Pat. Nos. 5,863,627 and 5,530,083, issued to Ward, and which are incorporated by reference herein in their entirety, describe in great detail how the commercially available products PurSil®, CarboSil® and Hydrosil® are processed.

The ionomeric block copolymer blends can comprise compatible blends of ionomeric block copolymer and a segmented polyurethane comprising an aromatic urea hard segment and a polycarbonate based soft segment. BioSpan® C, is an example of a suitable segmented polyurethane material and is commercially-available from the Polymer Technology Group, Inc. Another embodiment of the invention incorporates a segmented polyurethane comprising on aromatic urea hard segment and a polyether based soft segment. An example is BioSpan® SPU, which is a registered trademark for a segmented polyurethane material commercially-available from the Polymer Technology Group, Inc. Of course, such segmented polyurethanes, as well as the other polymeric materials discussed in this section, may be used in golf balls of the present invention in cores, layers, or covers separate from the ionomeric block copolymers described herein.

Even further, the ionomeric block copolymer blends can comprise compatible blends of ionomeric block copolymer and additional ionomers, such as ethylene methacrylic acid ionomers, and ethylene acrylic acid ionomers, and their terpolymers. The ionomeric block copolymer blends useful in the golf balls of the invention can also include other polymers, such as polyvinylalcohol, copolymers of ethylene and vinyl alcohol, poly(ethylethylene), poly(heptylethylene), poly(hexyldecylethylene), poly(isopentylethylene), poly(butyl acrylate), poly(2-ethylbutyl acrylate), poly(heptyl acrylate), poly(2-methylbutyl acrylate), poly(3-methylbutyl acrylate), poly(N-octadecylacrylamide), poly(octadecyl methacrylate), poly(butoxyethylene), poly(methoxyethylene), poly(pentyloxyethylene), poly(1,1-dichloroethylene), poly(4-[(2-butoxyethoxy)methyl] styrene), poly[oxy(ethoxymethyl)ethylene], poly(oxyethylethylene), poly(oxytetramethylene), poly(oxytrimethylene), poly(silanes) and poly(silazanes), polyamides, polycarbonates, polyesters, styrene block copolymers, polyetheramides, polyurethanes, main-chain heterocyclic polymers and poly(furan tetracarboxylic acid diimides), as well as the classes of polymers to which they belong.

The amounts of polymers used to form ionomeric block copolymers blends may vary from about 1 to about 99 parts of the ionomeric block copolymers to about 99 to about 1 parts of other polymers, based on the total weight of the blend. In one embodiment, the ionomeric block copolymers is present in an amount of about 95 percent to about 5 percent with about 5 percent to about 95 percent of one or more other polymers making up the rest of the blend. In another embodiment, the ionomeric block copolymers is present in an amount of about 90 percent to about 10 percent by weight of the blend, and at least one other polymer is present in an amount of about 10 percent to about 90 percent by weight of the blend. In another embodiment, the ionomeric block copolymers is present in an amount of about 80 percent to about 20 percent by weight of the blend, and at least one other polymer is present in an amount of about 20 percent to about 80 percent by weight of the blend. In another embodiment, the ionomeric block copolymers is present in an amount of about 75 percent to about 30 percent by weight of the blend, and at least one other polymer is present in an amount of about 25 percent to about 70 percent by weight of the blend.

Compositions of the present invention also may be blends with rubber materials. Some examples of rubbers that may be blended include, without limitation, Polybutadiene (BR), Polyisoprene (IR/NR), Styrene-butadiene rubber (SBR), Ethylene propylene diene rubber (EPDM), Ethylene propylene rubber (EPM), Nitrile butadiene rubber (NBR), Polychloroprene (CR), Polyacrylic rubber (ACM), Chlorosulfonated polyethylene (CM).

Blending of the ionomeric block copolymer compositions and the optional additional polymers is accomplished in a conventional manner using conventional equipment. Those of ordinary skill in the art are aware of the equipment well suited to perform such mixing. For example, heat mixing may be achieved by mixing the components in an internal mixer, such as a twin-screw extruder, a Banbury mixer, or a kneader, operating at a suitable temperature, such as from about 95° C. to about 200° C. Where various additives are to be added (as discussed above), any suitable method may be used to incorporate the additives together with the essential components. For example, the essential components and the additives are simultaneously heated and mixed. Alternatively, the essential components are premixed before the additives are added thereto and the overall composition heated and mixed.

Golf Ball Construction

The ionomeric block copolymer compositions of the present invention may be used with any type of ball construction. For example, golf balls formed according to the invention may have a one-piece construction formed from a homogeneous mass consisting entirely of the ionomeric block copolymer composition of the invention. Such balls may further include, if desired, blends of conventional materials, such as those discussed above. One-piece balls, formed with the compositions of the invention, are quite durable, but do not provide great distance because of relatively high spin and low velocity. Thus, another aspect of the present invention relates to two-piece, three-piece, and four-piece designs, as well as to golf balls having a double core, a double cover, an intermediate layer(s), a multilayer core, and/or a multilayer cover depending on the type of performance desired of the ball Other non-limiting examples of suitable types of ball constructions that may be used with the present invention include those described in U.S. Pat. Nos. 6,056,842, 5,688,191, 5,713,801, 5,803,831, 5,885,172, 5,919,100, 5,965,669, 5,981,654, 5,981,658, and 6,149,535, as well as in Publication Nos. U.S. 2001/0009310 A1, U.S. 2002/0025862, and U.S. 2002/0028885. The entire disclosures of these patents and published patent applications are incorporated by reference herein in their entireties.

As discussed, the golf balls of the invention include at least one layer that includes the ionomeric block copolymer compositions of the invention. In addition, as discussed below with specific reference the core, intermediate, and cover layers, the golf balls of the invention may include core layers, intermediate layers, or cover layers formed from materials known to those of skill in the art. These examples are not exhaustive, as skilled artisans would be aware that a variety of materials might be used to produce a golf ball of the invention with desired performance properties.

A. Core Layer(s)

The cores of the golf balls formed according to the invention may be solid, semi-solid, hollow, fluid-filled, or powder filled. For example, U.S. Pat. Nos. 6,180,040 and 6,180,722 disclose methods of preparing dual core golf balls. The entire disclosures of these patents are incorporated by reference herein.

While the cores of the invention may be formed with the ionomeric block copolymer compositions of the invention, conventional materials may also be used to form the cores. Suitable core materials include, but are not limited to, thermoset materials, such as rubber, styrene butadiene, polybutadiene, isoprene, polyisoprene, trans-isoprene, and polyurethane, and thermoplastic materials, such as conventional ionomer resins, polyamides, polyesters, and polyurethane. In one embodiment, at least one layer of the core is formed from a polybutadiene reaction product, such as the reaction products disclosed in U.S. Patent Publication No. 2003/0119989, the entire disclosure of which is incorporated by reference herein.

For example, the core may include a reaction product material formed from the conversion reaction of sufficient amounts of polybutadiene, a free radical source, and a sufficient amount of cis-to-trans catalyst to provide an amount of trans-isomer greater than the amount of trans-isomer present before the conversion reaction, which reaction occurs at a sufficient temperature to form the material that contains trans-isomer and cis-isomer.

The free-radical source is typically a peroxide, and preferably an organic peroxide, which decomposes during the cure cycle. Suitable free-radical sources include organic peroxide compounds, such as di-t-amyl peroxide, di(2-t-butyl-peroxyisopropyl)benzene peroxide or .alpha.,.alpha.-bis (t-butylperoxy)diisopropylbenzene, 1,1-bis(t-butylperoxy)-3,3,5-trimethylcyclohexane or 1,1-di(t-butylperoxy) 3,3,5-trimethyl cyclohexane, dicumyl peroxide, di-t-butyl peroxide, 2,5-di-(t-butylperoxy)-2,5-dimethyl hexane, n-butyl-4,4-bis(t-butylperoxy)valerate, lauryl peroxide, benzoyl peroxide, t-butyl hydroperoxide, and the like, and any mixture thereof.

The cis-to-trans catalyst may include an organosulfur compound, an inorganic sulfide, a Group VIA component, or a combination thereof. For instance, the cis-to-trans catalyst may be a halogenated organosulfur compound, such as pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol 2,3,4-fluorothiophenol; 3,4,5-fluorothiophenol; 2,3,4,5-tetrafluorothiophenol; 2,3,5,6-tetrafluorothiophenol; 4-chlorotetrafluorothiophenol; pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothioph-enol; 2,3,5,6-tetrachlorothiophenol; pentabromothiophenol; 2-bromothiophenol; 3-bromothiophenol; 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; pentaiodothiophenol; 2-iodothiophenol; 3-iodothiophenol; 4-iodothiophenol; 2,3-iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3,5,6-tetraiodothiophenoland; and their zinc salts, the metal salts thereof, and mixtures thereof, but is preferably pentachlorothiophenol or the metal salt thereof. In one embodiment, the metal salt is zinc, calcium, potassium, magnesium, sodium, lithium, or mixtures thereof.

The core composition may also include a crosslinking agent to increase the hardness of the reaction product. Suitable crosslinking agents include one or more metallic salts of unsaturated fatty acids having 3 to 8 carbon atoms, such as acrylic or methacrylic acid, or monocarboxylic acids, such as zinc, calcium, or magnesium acrylate salts, and the like, and mixtures thereof. Examples include, but are not limited to, one or more metal salt diacrylates, dimethacrylates, and monomethacrylates, wherein the metal is magnesium, calcium, zinc, aluminum, sodium, lithium, or nickel. Preferred acrylates include zinc acrylate, zinc diacrylate, zinc methacrylate, zinc dimethacrylate, and mixtures thereof.

Additional materials may be included in the core layer compositions outlined above. For example, coloring agents, optical brighteners, crosslinking agents, whitening agents such as $TiO_2$ and $ZnO$, UV absorbers, hindered amine light stabilizers, defoaming agents, processing aids, surfactants, and other conventional additives may be added to the core layer compositions of the invention. In addition, antioxidants, stabilizers, softening agents, plasticizers, including internal and external plasticizers, impact modifiers, foaming agents, density-adjusting fillers, reinforcing materials, and compatibilizers may also be added to any of the core layer compositions. One of ordinary skill in the art should be aware of the requisite amount for each type of additive to realize the benefits of that particular additive.

The core may also include one or more wound layers (surrounding a fluid or solid center) including at least one tensioned elastomeric material wound about the center. In one embodiment, the tensioned elastomeric material includes natural or synthetic elastomers or blends thereof. The synthetic elastomer preferably includes LYCRA. In another embodiment, the tensioned elastomeric material incorporates a polybutadiene reaction product as disclosed in U.S. patent application Ser. No. 10/190,705. In yet another embodiment, the tensioned elastomeric material may also be formed from conventional polyisoprene. In still another embodiment, a polyurea composition (as disclosed in U.S. patent application Ser. No. 10/228,311, filed Aug. 27, 2002, entitled "Golf Balls Comprising Light Stable Materials and Methods for Making Same," which is incorporated by reference in its entirety by reference herein) is used to form the tensioned elastomeric material. In another embodiment, solvent spun polyethers urea, as disclosed in U.S. Pat. No. 6,149,535, which is incorporated in its entirety by reference herein, is used to form the tensioned elastomeric material in an effort to achieve a smaller cross-sectional area with multiple strands.

The tensioned elastomeric layer may also be a high tensile filament having a tensile modulus of about 10,000 kpsi or greater, as disclosed in U.S. patent application Ser. Nos. 09/842,829 and 09/841,910, filed Apr. 27, 2001, entitled "All Rubber Golf Ball with Hoop-Stress Layer" and "MultiLayer Golf Ball With Hoop-Stress Layer," respectively, the entire disclosures of which are incorporated by reference herein.

B. Intermediate Layer(s)

When the golf ball of the present invention includes an intermediate layer, this layer may include any materials known to those of ordinary skill in the art, including various thermoset and thermoplastic materials, as well as blends thereof. For example, the intermediate layers of the golf ball of the invention may be formed with the ionomeric block copolymer compositions of the invention. The intermediate layer may likewise be formed, at least in part, from one or more homopolymeric or copolymeric materials, such as vinyl resins, polyolefins, polyurethanes, polyureas, polyamides, acrylic resins, olefinic thermoplastic rubbers, block copolymers of styrene and butadiene, isoprene or ethylene-butylene rubber, copoly(ether-amide), polyphenylene oxide resins, thermoplastic polyesters, ethylene, propylene, 1-butene or 1-hexene based homopolymers or copolymers, and the like.

The intermediate layer may also be formed from highly neutralized polymers such as those disclosed U.S. Patent Publication Nos. 2001/0018375 and 2001/0019971, which are incorporated herein in their entirety by express reference thereto; grafted and non-grafted metallocene catalyzed polyolefins and polyamides, polyamide/ionomer blends, and polyamide/nonionomer blends, such as those disclosed in U.S. patent application Ser. No. 10/138,304, filed May 6, 2002, entitled "Golf Ball Incorporating Grafted Metallocene Catalyzed Polymer Blends," which is incorporated by reference herein in its entirety; among other polymers. Examples of other suitable intermediate layer materials include blends of some of the above materials, such as those disclosed in U.S. Pat. No. 5,688,181, the entire disclosure of which is incorporated by reference herein.

Preferably, the optional intermediate layer includes polymers, such as ethylene, propylene, butene-1 or hexane-1 based homopolymers or copolymers including functional monomers, such as acrylic and methacrylic acid and fully or partially neutralized ionomer resins and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly (phenylene sulfide), acrylonitrile-butadiene, acrylic-styrene-acrylonitrile, poly(ethylene terephthalate), poly(butylene terephthalate), poly(ethelyne vinyl alcohol), poly(tetrafluoroethylene) and their copolymers including functional comonomers, and blends thereof. Suitable cover compositions also include a polyether or polyester thermoplastic urethane, a thermoset polyurethane, a low modulus ionomer, such as acid-containing ethylene copolymer ionomers, including E/X/Y terpolymers where E is ethylene, X is an acrylate or methacrylate-based softening comonomer present in about 0 to 50 weight percent and Y is acrylic or methacrylic acid present in about 5 to 35 weight percent. More preferably, in a low spin rate embodiment designed for maximum distance, the acrylic or methacrylic acid is present in about 15 to 35 weight percent, making the ionomer a high modulus ionomer. In a high spin embodiment, the cover includes an ionomer where an acid is present in about 10 to 15 weight percent and includes a softening comonomer.

Additional materials may be included in the intermediate layer compositions outlined above. For example, catalysts, coloring agents, optical brighteners, crosslinking agents, whitening agents such as $TiO_2$ and ZnO, UV absorbers, hindered amine light stabilizers, defoaming agents, processing aids, surfactants, and other conventional additives may be added to the intermediate layer compositions of the invention. In addition, antioxidants, stabilizers, softening agents, plasticizers, including internal and external plasticizers, impact modifiers, foaming agents, density-adjusting fillers, reinforcing materials, and compatibilizers may also be added to any of the intermediate layer compositions. One of ordinary skill in the art should be aware of the requisite amount for each type of additive to realize the benefits of that particular additive.

The intermediate layer may also be formed of a binding material and an interstitial material distributed in the binding material, as discussed in U.S. patent application Ser. No. 10/028,826, filed Dec. 28, 2001, entitled, "Golf Ball with a Radially Oriented Transversely Isotropic Layer and Manufacture of Same," the entire disclosure of which is incorporated by reference herein. In addition, at least one intermediate layer may also be a moisture barrier layer, such as the ones described in U.S. Pat. No. 5,820,488, which is incorporated in its entirety by reference herein. The intermediate layer may also be formed from any of the polyurethane, polyurea, and polybutadiene materials discussed co-pending U.S. patent application Ser. No. 10/228,311.

C. Cover Layer(s)

The cover provides the interface between the ball and a club. A cover typically includes at least one layer and may contain indentations such as dimples and/or ridges. Paints and/or laminates are typically disposed about the cover to protect the golf ball during use thereof. The cover may include a plurality of layers, e.g., an inner cover layer disposed about a golf ball center and an outer cover layer formed thereon.

Cover layers may be formed of the ionomeric block copolymer compositions of the invention, however, other cover materials known to those of skill in the art are also contemplated for use with the present invention. For example, the cover may be formed of polyurea, polyurethane, or mixtures thereof, as disclosed in U.S. Patent Publication Nos. 2003/0096936 and 2003/0212240. The entire disclosures of these applications are incorporated by reference herein.

In addition, cover layers may also be formed of one or more homopolymeric or copolymeric materials, such as vinyl resins, polyolefins, conventional polyurethanes and polyureas, such as the ones disclosed in U.S. Pat. Nos. 5,334,673, and 5,484,870, polyamides, acrylic resins and blends of these resins with poly vinyl chloride, elastomers, and the like, thermoplastic urethanes, olefinic thermplastic rubbers, block copolymers of styrene and butadiene, polyphenylene oxide resins or blends of polyphenylene oxide with high impact polystyrene, thermoplastic polyesters, ethylene, propylene, 1-butene or 1-hexane based homopolymers or copolymers including functional monomers, methyl acrylate, methyl methacrylate homopolymers and copolymers, low acid ionomers, high acid ionomers, alloys, and mixtures thereof. The cover may also be at least partially formed from the polybutadiene reaction product discussed above with respect to the core. In another embodiment, the cover is formed from balata, trans-polyisoprene, or a mixture thereof.

The cover may include a polyurethane composition comprising the reaction product of at least one polyisocyanate, polyol, and at least one curing agent.

Any polyisocyanate available to one of ordinary skill in the art is suitable for use according to the invention. Exemplary polyisocyanates include, but are not limited to, 4,4'-diphenylmethane diisocyanate ("MDI"), polymeric MDI, carbodiimide-modified liquid MDI, 4,4'-dicyclohexyl-methane diisocyanate ("H12MDI"), p-phenylene diisocyanate ("PPDI"), toluene diisocyanate ("TDI"), 3,3'-dimethyl-4,4'-biphenylene diisocyanate ("TODI"), isophoronediisocyanate ("IPDI"), hexamethylene diisocyanate ("HDI"), naphthalene diisocyanate ("NDI"); xylene diisocyanate ("XDI"); para-tetramethylxylene diisocyanate ("p-TMXDI"); meta-tetramethylxylene diisocyanate ("m-TMXDI"); ethylene diisocyanate; propylene-1,2-diisocyanate; tetramethylene-1,4-diisocyanate; cyclohexyl diisocyanate; 1,6-hexamethylene-diisocyanate ("HDI"); dodecane-1, 12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; triisocyanate of HDI; triisocyanate of 2,4,4-trimethyl-1,6-hexane diisocyanate ("TMDI"), tetracene diisocyanate, napthalene diisocyanate, anthracene diisocyanate, and mixtures thereof. Polyisocyanates are known to those of ordinary skill in the art as having more than one isocyanate group, e.g., di-, tri-, and tetra-isocyanate. Preferably, the polyisocyanate includes MDI, PPDI, TDI, or a mixture thereof, and more preferably, the polyisocyanate includes MDI. It should be understood that, as used herein, the term "MDI" includes 4,4'-diphenylmethane diisocyanate, polymeric MDI, carbodiimide-modified liquid MDI, and mixtures thereof and, additionally, that the diisocyanate employed may be "low free monomer," understood by one of ordinary skill in the art to have lower levels of "free" monomer isocyanate groups, typically less than about 0.1% free monomer groups. Examples of "low free monomer" diisocyanates include, but are not limited to Low Free Monomer MDI, Low Free Monomer TDI, and Low Free Monomer PPDI.

The at least one polyisocyanate should have less than about 14% unreacted NCO groups. Preferably, the at least one polyisocyanate has no greater than about 7.5% NCO, more preferably, between about 2.5% and about 7.5%, and most preferably, between about 4% to about 6.5%.

Any polyol available to one of ordinary skill in the art is suitable for use according to the invention. Exemplary polyols include, but are not limited to, polyether polyols, hydroxy-terminated polybutadiene (including partially/fully hydrogenated derivatives), polyester polyols, polycaprolactone polyols, and polycarbonate polyols. Preferably, the polyol of the present invention includes PTMEG. In another embodiment, polyester polyols are included in the polyurethane material of the invention. In another embodiment, polycaprolactone polyols are included in the materials of the invention. In yet another embodiment, the polycarbonate polyols are included in the polyurethane material of the invention.

Polyamine curatives are also suitable for use in the polyurethane compositions usable in golf balls of the invention and have been found to improve cut, shear, and impact resistance of the resultant balls. Preferred polyamine curatives include, but are not limited to, 3,5-dimethylthio-2,4-toluenediamine and isomers thereof; 3,5-diethyltoluene-2,4-diamine and isomers thereof, such as 3,5-diethyltoluene-2,6-diamine; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline); polytetramethyleneoxide-di-p-aminobenzoate; N,N'-dialkyldiamino diphenyl methane; p,p'-methylene dianiline ("MDA"); m-phenylenediamine ("MPDA"); 4,4'-methylene-bis-(2-chloroaniline) ("MOCA"); 4,4'-methylene-bis-(2,6-diethylaniline); 4,4'-di-amino-3,3'-diethyl-5,5'-dimethyl diphenylmethane; 2,2',3,3'-tetrachloro diamino diphenylmethane; 4,4'-methylene-bis-(3-chloro-2,6-diethylaniline); trimethylene glycol di-p-aminobenzoate; and mixtures thereof. Preferably, the curing agent of the present invention includes 3,5-dimethylthio-2,4-toluenediamine and isomers thereof, such as ETHACURE 300™, commercially available from Albermarle Corporation of Baton Rouge, La. Suitable polyamine curatives, which include both primary and secondary amines, preferably have molecular weights ranging from about 64 to about 2000.

At least one of a diol, triol, tetraol, or hydroxy-terminated curatives may be added to the aforementioned polyurethane composition. Suitable diol, triol, and tetraol groups include ethylene glycol; diethylene glycol; polyethylene glycol; propylene glycol; polypropylene glycol; lower molecular weight polytetramethylene ether glycol; 1,3-bis(2-hydroxyethoxy)benzene; 1,3-bis-[2-(2-hydroxyethoxy)ethoxy]benzene; 1,3-bis-{2-[2-(2-hydroxyethoxy)ethoxy]ethoxy}benzene; 1,4-butanediol; 1,5-pentanediol; 1,6-hexanediol; resorcinol-di-(β-hydroxyethyl)ether; hydroquinone-di-(β-hydroxyethyl) ether; and mixtures thereof. Preferred hydroxy-terminated curatives include ethylene glycol; diethylene glycol; 1,4-butanediol; 1,5-pentanediol; 1,6-hexanediol, trimethylol propane, and mixtures thereof. Preferably, the hydroxy-terminated curatives have molecular weights ranging from about 48 to 2000. It should be understood that molecular weight, as used herein, is the absolute weight average molecular weight and would be understood as such by one of ordinary skill in the art.

Both the hydroxy-terminated and amine curatives can include one or more saturated, unsaturated, aromatic, and cyclic groups. Additionally, the hydroxy-terminated and amine curatives can include one or more halogen groups.

The polyurethane composition can be formed with a blend or mixture of curing agents. If desired, however, the polyurethane composition may be formed with a single curing agent.

Any method known to one of ordinary skill in the art may be used to combine the polyisocyanate, polyol, and curing agent of the present invention. One commonly employed method, known in the art as a one-shot method, involves concurrent mixing of the polyisocyanate, polyol, and curing agent. This method results in a mixture that is inhomogenous (more random) and affords the manufacturer less control over the molecular structure of the resultant composition. A preferred method of mixing is known as a prepolymer method. In this method, the polyisocyanate and the polyol are mixed separately prior to addition of the curing agent. This method affords a more homogeneous mixture resulting in a more consistent polymer composition.

The use of a castable, reactive material, which is applied in a fluid form, makes it possible to obtain very thin outer cover layers on golf balls. Specifically, it has been found that castable, reactive liquids, which react to form a urethane elastomer material, provide desirable very thin outer cover layers.

The castable, reactive liquid employed to form the urethane elastomer material can be applied over the inner core using a variety of application techniques such as spraying, dipping, spin coating, or flow coating methods which are well known in the art. An example of a suitable coating technique is that which is disclosed in U.S. Pat. No. 5,733,428, filed May 2, 1995, entitled "Method And Apparatus For Forming Polyurethane Cover On A Golf Ball", the disclosure of which is hereby incorporated by reference in its entirety in the present application.

Additional materials may be included in the cover layer compositions outlined above. For example, catalysts, coloring agents, optical brighteners, crosslinking agents, whitening agents such as $TiO_2$ and $ZnO$, UV absorbers, hindered amine light stabilizers, defoaming agents, processing aids, surfactants, and other conventional additives may be added to the cover layer compositions of the invention. In addition, antioxidants, stabilizers, softening agents, plasticizers, including internal and external plasticizers, impact modifiers, foaming agents, density-adjusting fillers, reinforcing materials, and compatibilizers may also be added to any of the cover layer compositions. Those of ordinary skill in the art should be aware of the requisite amount for each type of additive to realize the benefits of that particular additive.

In addition, while hardness gradients are typically used in a golf ball to achieve certain characteristics, the present invention also contemplates the compositions of the invention being used in a golf ball with multiple cover layers having essentially the same hardness, wherein at least one of the layers has been modified in some way to alter a property that affects the performance of the ball. Such ball constructions are disclosed in U.S. patent application Ser. No. 10/167,744, filed Jun. 13, 2002, entitled "Golf Ball with Multiple Cover Layers," the entire disclosure of which is incorporated by reference herein.

D. Methods for Forming Golf Balls

The golf balls of the invention may be formed using a variety of application techniques such as compression molding, flip molding, injection molding, retractable pin injection molding, reaction injection molding (RIM), liquid injection molding (LIM), casting, vacuum forming, powder coating, flow coating, spin coating, dipping, spraying, and the like. A method of injection molding using a split vent pin can be found in U.S. Patent Publication No. 2002/0079615. Examples of retractable pin injection molding may be found in U.S. Pat. Nos. 6,129,881, 6,235,230, and 6,379,138. These molding references are incorporated in their entirety by reference herein. In addition, a chilled chamber, i.e., a cooling jacket, such as the one disclosed in U.S. patent application Ser. No. 09/717,136, filed Nov. 22, 2000, entitled "Method of Making Golf Balls" may be used to cool the compositions of the invention when casting, which also allows for a higher loading of catalyst into the system.

One skilled in the art would appreciate that the molding method used may be determined at least partially by the properties of the composition. For example, casting, RIM, or LIM may be preferred when the material is thermoset, whereas compression molding or injection molding may be preferred for thermoplastic compositions. Compression molding, however, may also be used for thermoset inner ball materials. For example, when cores are formed from a thermoset material, compression molding is a particularly suitable method of forming the core, whereas when the cores are formed of a thermoplastic material, the cores may be injection molded. In addition, the intermediate layer may also be formed from using any suitable method known to those of ordinary skill in the art. For example, an intermediate layer may be formed by blow molding and covered with a dimpled cover layer formed by injection molding, compression molding, casting, vacuum forming, powder coating, and the like.

In addition, when covers are formed of polyurea and/or polyurethane compositions, these materials may be applied over an inner ball using a variety of application techniques such as spraying, compression molding, dipping, spin coating, casting, or flow coating methods that are well known in the art. Examples of forming polyurea and polyurethane materials about an inner ball are disclosed in U.S. Pat. Nos. 5,733,428, 5,006,297, and 5,334,673, which are incorporated by reference in their entirety herein. In one embodiment, a combination of casting and compression molding can be used to form a polyurethane or polyurea composition over an inner ball. However, the method of forming covers according to the invention is not limited to the use of these techniques; other methods known to those skilled in the art may also be employed.

Prior to forming the cover layer, the inner ball, i.e., the core and any intermediate layers disposed thereon, may be surface treated to increase the adhesion between the outer surface of the inner ball and the cover. Examples of such surface treatment may include mechanically or chemically abrading the outer surface of the subassembly. Additionally, the inner ball may be subjected to corona discharge, plasma treatment, and/or silane dipping prior to forming the cover around it. Other layers of the ball, e.g., the core, also may be surface treated. Examples of these and other surface treatment techniques can be found in U.S. Pat. No. 6,315,915, which is incorporated by reference in its entirety. The methods discussed herein and other manufacturing methods for forming the golf ball components of the present invention are also disclosed in U.S. Pat. Nos. 6,207,784 and 5,484,870, the disclosures of which are incorporated herein by reference in their entirety.

In another embodiment, a polymer mixture can be subjected to, e.g., a compression or injection molding process, to obtain solid spheres for the center or hemispherical shells for forming an intermediate layer. The polymer mixture is subjected to a molding cycle in which heat and pressure are applied while the mixture is confined within a mold. The cavity shape depends on the portion of the golf ball being formed. The compression and heat liberates free radicals by decomposing one or more peroxides, which may initiate the cis-to-trans conversion and crosslinking simultaneously. The temperature and duration of the molding cycle are selected based upon the type of peroxide and cis-trans catalyst selected. The molding cycle may have a single step of molding the mixture at a single temperature for a fixed time duration. An example of a single step molding cycle, for a mixture that contains dicumyl peroxide, would hold the polymer mixture at 340° F. for a duration of 15 minutes. The molding cycle may also include a two-step process, in which the polymer mixture is held in the mold at an initial temperature for an initial duration of time, followed by holding at a second, typically higher temperature for a second duration of time. An example of a two-step molding cycle would be holding the mold at 290° F. for 40 minutes, then ramping the mold to 340° F. where it is held for a duration of 20 minutes. In a preferred embodiment of the current invention, a single-step cure cycle is employed. Single-step processes are effective and efficient, reducing the time and cost of a two-step process. The resilient polymer component, polybutadiene, cis-to-trans conversion catalyst, additional polymers, free-radical initiator, filler, and any other materials used in forming either the golf ball center or any portion of the core, in accordance with the invention, may be combined to form a golf ball by an injection molding process, which is also well-known to one of ordinary skill in the art. Although the curing time depends on the various materials selected, a particularly suitable curing time is about 5 to 18 minutes, preferably from about 8 to 15 minutes, and more preferably from about 10 to 12 minutes. Those of ordinary skill in the art will be readily able to adjust the curing time upward or downward based on the particular materials used and the discussion herein.

The cover may be formed around the coated core by mixing and introducing the material in the mold halves. It is important that the viscosity be measured over time, so that the subsequent steps of filling each mold half, introducing the core into one half and closing the mold can be properly timed for accomplishing centering of the core cover halves fusion and achieving overall uniformity. Suitable viscosity range of the curing urethane mix for introducing cores into the mold halves is determined to be approximately between about 2,000 cP and about 30,000 cP, with the preferred range of about 8,000 cP to about 15,000 cP.

To start the cover formation, mixing of the prepolymer and curative is accomplished in motorized mixer including mixing head by feeding through lines metered amounts of curative and prepolymer. Top preheated mold halves are filled and placed in fixture units using pins moving into holes in each mold. After the reacting materials have resided in top mold halves for about 50 to about 80 seconds, a core is lowered at a controlled speed into the gelling reacting mixture. At a later time, a bottom mold half or a series of bottom mold halves have similar mixture amounts introduced into the cavity.

A ball cup holds the ball core through reduced pressure (or partial vacuum) in the hose. Upon location of the coated core in the halves of the mold after gelling for about 50 to about 80 seconds, the vacuum is released allowing core to be released. The mold halves, with core and solidified cover half thereon, are removed from the centering fixture unit, inverted and mated with other mold halves which, at an appropriate time earlier, have had a selected quantity of reacting polyurethane prepolymer and curing agent introduced therein to commence gelling.

Similarly, U.S. Pat. No. 5,006,297 to Brown et al. and U.S. Pat. No. 5,334,673 to Wu both also disclose suitable molding techniques which may be utilized to apply the castable reactive liquids employed in the present invention. The disclosures of these patents are hereby incorporated by reference in their entirety. However, the method of the invention is not limited to the use of these techniques.

E. Dimples

The golf balls of the invention are preferably designed with certain flight characteristics in mind. The use of various dimple patterns and profiles provides a relatively effective way to modify the aerodynamic characteristics of a golf ball. As such, the manner in which the dimples are arranged on the surface of the ball can be by any available method. For instance, the ball may have an icosahedron-based pattern, such as described in U.S. Pat. No. 4,560,168, or an octahedral-based dimple patterns as described in U.S. Pat. No. 4,960,281. Alternatively, the dimple pattern can be arranged according to phyllotactic patterns, such as described in U.S. Pat. No. 6,338,684, which is incorporated herein in its entirety.

Dimple patterns may also be based on Archimedean patterns including a truncated octahedron, a great rhombcuboctahedron, a truncated dodecahedron, and a great rhombicosidodecahedron, wherein the pattern has a non-linear parting line, as disclosed in U.S. patent application Ser. No. 10/078,417, which is incorporated in its entirety by reference herein. The golf balls of the present invention may also be covered with non-circular shaped dimples, i.e., amorphous shaped dimples, as disclosed in U.S. Pat. No. 6,409,615, which is incorporated in its entirety by reference herein.

Dimple patterns that provide a high percentage of surface coverage are preferred, and are well known in the art. For example, U.S. Pat. Nos. 5,562,552, 5,575,477, 5,957,787, 5,249,804, and 4,925,193 disclose geometric patterns for positioning dimples on a golf ball. In one embodiment, the golf balls of the invention have a dimple coverage of the surface area of the cover of at least about 60 percent, preferably at least about 65 percent, and more preferably at least 70 percent or greater. Dimple patterns having even higher dimple coverage values may also be used with the present invention. Thus, the golf balls of the present invention may have a dimple coverage of at least about 75 percent or greater, about 80 percent or greater, or even about 85 percent or greater.

In addition, a tubular lattice pattern, such as the one disclosed in U.S. Pat. No. 6,290,615, which is incorporated by reference in its entirety herein, may also be used with golf balls of the present invention. The golf balls of the present invention may also have a plurality of pyramidal projections disposed on the intermediate layer of the ball, as disclosed in U.S. Pat. No. 6,383,092, which is incorporated in its entirety by reference herein. The plurality of pyramidal projections on the golf ball may cover between about 20 percent to about 80 of the surface of the intermediate layer.

In an alternative embodiment, the golf ball may have a non-planar parting line allowing for some of the plurality of pyramidal projections to be disposed about the equator. Such a golf ball may be fabricated using a mold as disclosed in U.S. patent application Ser. No. 09/442,845, filed Nov. 18, 1999, entitled "Mold For A Golf Ball," and which is incorporated in its entirety by reference herein. This embodiment allows for greater uniformity of the pyramidal projections.

Several additional non-limiting examples of dimple patterns with varying sizes of dimples are also provided in U.S.

Pat. Nos. 6,358,161 and 6,213,898, the entire disclosures of which are incorporated by reference herein.

The total number of dimples on the ball, or dimple count, may vary depending such factors as the sizes of the dimples and the pattern selected. In general, the total number of dimples on the ball preferably is between about 100 to about 1000 dimples, although one skilled in the art would recognize that differing dimple counts within this range can significantly alter the flight performance of the ball. In one embodiment, the dimple count is about 380 dimples or greater, but more preferably is about 400 dimples or greater, and even more preferably is about 420 dimples or greater. In one embodiment, the dimple count on the ball is about 422 dimples. In some cases, it may be desirable to have fewer dimples on the ball. Thus, one embodiment of the present invention has a dimple count of about 380 dimples or less, and more preferably is about 350 dimples or less.

Dimple profiles revolving a catenary curve about its symmetrical axis may increase aerodynamic efficiency, provide a convenient way to alter the dimples to adjust ball performance without changing the dimple pattern, and result in uniformly increased flight distance for golfers of all swing speeds. Thus, catenary curve dimple profiles, as disclosed in U.S. patent application Ser. No. 09/989,191, filed Nov. 21, 2001, entitled "Golf Ball Dimples with a Catenary Curve Profile," which is incorporated in its entirety by reference herein, is contemplated for use with the golf balls of the present invention.

F. Golf Ball Post-Processing

The golf balls of the present invention may be painted, coated, or surface treated for further benefits. For example, a golf ball of the invention may be treated with a base resin paint composition or the cover composition may contain certain additives to achieve a desired color characteristic. In one embodiment, the golf ball cover composition contains a fluorescent whitening agent, e.g., 2,2'-(2,5-thiophenediyl)bis (5-tert-butylbenzoxazole), to provide improved weather resistance and brightness. An example of such a fluorescent whitening agent is disclosed in U.S. Patent Publication No. 2002/0082358, which is incorporated by reference herein in its entirety.

Protective and decorative coating materials, as well as methods of applying such materials to the surface of a golf ball cover are well known in the golf ball art. Generally, such coating materials comprise urethanes, urethane hybrids, epoxies, polyesters and acrylics. If desired, more than one coating layer can be used. The coating layer(s) may be applied by any suitable method known to those of ordinary skill in the art. For example, the coating layer(s) may be applied to the golf ball cover by an in-mold coating process, such as described in U.S. Pat. No. 5,849,168, which is incorporated in its entirety by reference herein. In addition, the golf balls of the invention may be painted or coated with an ultraviolet curable/treatable ink, by using the methods and materials disclosed in U.S. Pat. Nos. 6,500,495, 6,248, 804, and 6,099,415, the entire disclosures of which are incorporated by reference herein.

In addition, trademarks or other indicia may be stamped, i.e., pad-printed, on the outer surface of the ball cover, and the stamped outer surface is then treated with at least one clear coat to give the ball a glossy finish and protect the indicia stamped on the cover.

The golf balls of the invention may also be subjected to dye sublimation, wherein at least one golf ball component is subjected to at least one sublimating ink that migrates at a depth into the outer surface and forms an indicia. The at least one sublimating ink preferably includes at least one of an azo dye, a nitroarylamine dye, or an anthraquinone dye. See U.S. Patent Publication No. 2003/0106442, the entire disclosure of which is incorporated by reference herein.

Laser marking of a selected surface portion of a golf ball causing the laser light-irradiated portion to change color is also contemplated for use with the present invention. U.S. Pat. Nos. 5,248,878 and 6,075,223 generally disclose such methods, the entire disclosures of which are incorporated by reference herein. In addition, the golf balls may be subjected to ablation, i.e., directing a beam of laser radiation onto a portion of the cover, irradiating the cover portion, wherein the irradiated cover portion is ablated to form a detectable mark, wherein no significant discoloration of the cover portion results therefrom. Ablation is discussed in U.S. Pat. No. 6,462,303, which is incorporated in its entirety by reference herein.

Golf Ball Properties

The properties such as hardness, modulus, core diameter, intermediate layer thickness and cover layer thickness of the golf balls of the present invention have been found to effect play characteristics such as spin, initial velocity and feel of the present golf balls. For example, the flexural and/or tensile modulus of the intermediate layer are believed to have an effect on the "feel" of the golf balls of the present invention. It should be understood that the ranges herein are meant to be intermixed with each other, i.e., the low end of one range may be combined with a high end of another range.

A. Component Dimensions

Dimensions of golf ball components, i.e., thickness and diameter, may vary depending on the desired properties. For the purposes of the invention, any layer thickness may be employed. Non-limiting examples of the various embodiments outlined above are provided here with respect to layer dimensions.

The present invention relates to golf balls of any size. While USGA specifications limit the size of a competition golf ball to more than 1.68 inches in diameter, golf balls of any size can be used for leisure golf play. The preferred diameter of the golf balls is from about 1.68 inches to about 1.8 inches. The more preferred diameter is from about 1.68 inches to about 1.76 inches. A diameter of from about 1.68 inches to about 1.74 inches is most preferred, however diameters anywhere in the range of from 1.7 to about 1.95 inches can be used. Preferably, the overall diameter of the core and all intermediate layers is about 80 percent to about 98, about 85 to about 98, about 90 to about 98, or about 90 to about 95 percent of the overall diameter of the finished ball.

The core may have a diameter ranging from about 0.09 inches to about 1.65 inches. In one embodiment, the diameter of the core of the present invention is about 1.2 inches to about 1.630 inches. In another embodiment, the diameter of the core is about 1.3 inches to about 1.6 inches, preferably from about 1.39 inches to about 1.6 inches, and more preferably from about 1.5 inches to about 1.6 inches. In yet another embodiment, the core has a diameter of about 1.55 inches to about 1.65 inches. For example, the core may have a diameter of about 1.585 inches.

The core of the golf ball may also be extremely large in relation to the rest of the ball. For example, in one embodiment, the core makes up about 90 percent to about 98 percent of the ball, preferably about 94 percent to about 96 percent of the ball. In this embodiment, the diameter of the core is preferably about 1.54 inches or greater, preferably about 1.55 inches or greater. In one embodiment, the core diameter is about 1.59 inches or greater. In another embodiment, the diameter of the core is about 1.64 inches or less.

When the core includes an inner core layer and an outer core layer, the inner core layer is preferably about 0.9 inches or greater and the outer core layer preferably has a thickness of about 0.1 inches or greater. In one embodiment, the inner core layer has a diameter from about 0.09 inches to about 1.2 inches and the outer core layer has a thickness from about 0.1 inches to about 0.8 inches. In yet another embodiment, the inner core layer diameter is from about 0.095 inches to about 1.1 inches and the outer core layer has a thickness of about 0.20 inches to about 0.03 inches.

The cover typically has a thickness to provide sufficient strength, good performance characteristics, and durability. In one embodiment, the cover thickness is from about 0.02 inches to about 0.35 inches. The cover preferably has a thickness of about 0.02 inches to about 0.12 inches, preferably about 0.1 inches or less. When the compositions of the invention are used to form the outer cover of a golf ball, the cover may have a thickness of about 0.1 inches or less, preferably about 0.07 inches or less. In one embodiment, the outer cover has a thickness from about 0.02 inches to about 0.07 inches. In another embodiment, the cover thickness is about 0.05 inches or less, preferably from about 0.02 inches to about 0.05 inches. In yet another embodiment, the outer cover layer of such a golf ball is between about 0.02 inches and about 0.045 inches. In still another embodiment, the outer cover layer is about 0.025 to about 0.04 inches thick. In one embodiment, the outer cover layer is about 0.03 inches thick.

In a golf ball having a relatively large core, e.g., about 1.55 inches to about 1.63 inches, the cover may have a thickness of about 0.02 inches to about 0.06 inches, preferably about 0.03 inches to about 0.05 inches. In one embodiment, the golf ball has a core with a diameter of about 1.56 inches to about 1.60 inches and a cover layer with a thickness of about 0.045 inches to about 0.050 inches. In another embodiment, the core has a diameter of about 1.58 inches to about 1.59 inches and a cover with a thickness of about 0.048 inches to about 0.050 inches. For example, a suitable golf ball construction according to the invention may include a core of about 1.585 inches and a cover having a thickness of about 0.049 inches. These dimensions are also suitable for a golf ball having dual core and dual cover layers, e.g., a center of soft polybutadiene, an outer core layer of a high performance polymer, an ionomer inner cover layer, and a soft urethane outer cover.

The range of thicknesses for an intermediate layer of a golf ball is large because of the vast possibilities when using an intermediate layer, i.e., as an outer core layer, an inner cover layer, a wound layer, a moisture/vapor barrier layer. When used in a golf ball of the invention, the intermediate layer, or inner cover layer, may have a thickness about 0.3 inches or less. In one embodiment, the thickness of the intermediate layer is from about 0.002 inches to about 0.1 inches, preferably about 0.01 inches or greater. In one embodiment, the thickness of the intermediate layer is about 0.09 inches or less, preferably about 0.06 inches or less. In another embodiment, the intermediate layer thickness is about 0.05 inches or less, more preferably about 0.01 inches to about 0.045 inches. In one embodiment, the intermediate layer, thickness is about 0.02 inches to about 0.04 inches. In another embodiment, the intermediate layer thickness is from about 0.025 inches to about 0.035 inches. In yet another embodiment, the thickness of the intermediate layer is about 0.035 inches thick. In still another embodiment, the inner cover layer is from about 0.03 inches to about 0.035 inches thick. Varying combinations of these ranges of thickness for the intermediate and outer cover layers may be used in combination with other embodiments described herein.

The ratio of the thickness of the intermediate layer to the outer cover layer is preferably about 10 or less, preferably about 5 or less, or preferably from about 3 or less. In another embodiment, the ratio of the thickness of the intermediate layer to the outer cover layer is about 1 or less.

The core and intermediate layer(s) together form an inner ball preferably having a diameter of about 1.48 inches or greater for a 1.68 inch ball. In one embodiment, the inner ball of a 1.68-inch ball has a diameter of about 1.52 inches or greater. In another embodiment, the inner ball of a 1.68-inch ball has a diameter of about 1.66 inches or less. In yet another embodiment, a 1.72 inch (or more) ball has an inner ball diameter of about 1.50 inches or greater. In still another embodiment, the diameter of the inner ball for a 1.72 inch ball is about 1.70 inches or less.

B. Hardness

Most golf balls consist of layers having different hardnesses, e.g., hardness gradients, to achieve desired performance characteristics. The present invention contemplates golf balls having hardness gradients between layers, as well as those golf balls with layers having the same hardness.

It should be understood, especially to one of ordinary skill in the art, that there is a fundamental difference between "material hardness" and "hardness, as measured directly on a golf ball." Material hardness is defined by the procedure set forth in ASTM-D2240 and generally involves measuring the hardness of a flat "slab" or "button" formed of the material of which the hardness is to be measured. Hardness, when measured directly on a golf ball (or other spherical surface) is a completely different measurement and, therefore, results in a different hardness value. This difference results from a number of factors including, but not limited to, ball construction (i.e., core type, number of core and/or cover layers, etc.), ball (or sphere) diameter, and the material composition of adjacent layers. It should also be understood that the two measurement techniques are not linearly related and, therefore, one hardness value cannot easily be correlated to the other.

The cores of the present invention may have varying hardnesses depending on the particular golf ball construction. In one embodiment, the core hardness is at least about 15 Shore A, preferably about 30 Shore A, as measured on a formed sphere. In another embodiment, the core has a hardness of about 50 Shore A to about 90 Shore D. In yet another embodiment, the hardness of the core is about 80 Shore D or less. Preferably, the core has a hardness about 30 to about 65 Shore D, and more preferably, the core has a hardness about 35 to about 60 Shore D.

The intermediate layer(s) of the present invention may also vary in hardness depending on the specific construction of the ball. In one embodiment, the hardness of the intermediate layer is about 30 Shore D or greater. In another embodiment, the hardness of the intermediate layer is about 90 Shore D or less, preferably about 80 Shore D or less, and more preferably about 70 Shore D or less. In yet another embodiment, the hardness of the intermediate layer is about 50 Shore D or greater, preferably about 55 Shore D or greater. In one embodiment, the intermediate layer hardness is from about 55 Shore D to about 65 Shore D. The intermediate layer may also be about 65 Shore D or greater.

When the intermediate layer is intended to be harder than the core layer, the ratio of the intermediate layer hardness to the core hardness preferably about 2 or less. In one embodiment, the ratio is about 1.8 or less. In yet another embodiment, the ratio is about 1.3 or less.

As with the core and intermediate layers, the cover hardness may vary depending on the construction and desired characteristics of the golf ball. The ratio of cover hardness to inner ball hardness is a primary variable used to control the aerodynamics of a ball and, in particular, the spin of a ball. In general, the harder the inner ball, the greater the driver spin and the softer the cover, the greater the driver spin.

For example, when the intermediate layer is intended to be the hardest point in the ball, e.g., about 50 Shore D to about 75 Shore D, the cover material may have a hardness of about 20 Shore D or greater, preferably about 25 Shore D or greater, and more preferably about 30 Shore D or greater, as measured on the slab. In another embodiment, the cover itself has a hardness of about 30 Shore D or greater. In particular, the cover may be from about 30 Shore D to about 70 Shore D. In one embodiment, the cover has a hardness of about 40 Shore D to about 65 Shore D, and in another embodiment, about 40 Shore D to about 55 Shore D. In another aspect of the invention, the cover has a hardness less than about 45 Shore D, preferably less than about 40 Shore D, and more preferably about 25 Shore D to about 40 Shore D. In one embodiment, the cover has a hardness from about 30 Shore D to about 40 Shore D.

In this embodiment when the outer cover layer is softer than the intermediate layer or inner cover layer, the ratio of the Shore D hardness of the outer cover material to the intermediate layer material is about 0.8 or less, preferably about 0.75 or less, and more preferably about 0.7 or less. In another embodiment, the ratio is about 0.5 or less, preferably about 0.45 or less.

In yet another embodiment, the ratio is about 0.1 or less when the cover and intermediate layer materials have hardnesses that are substantially the same. When the hardness differential between the cover layer and the intermediate layer is not intended to be as significant, the cover may have a hardness of about 55 Shore D to about 65 Shore D. In this embodiment, the ratio of the Shore D hardness of the outer cover to the intermediate layer is about 1.0 or less, preferably about 0.9 or less.

The cover hardness may also be defined in terms of Shore C. For example, the cover may have a hardness of about 70 Shore C or greater, preferably about 80 Shore C or greater. In another embodiment, the cover has a hardness of about 95 Shore C or less, preferably about 90 Shore C or less.

In another embodiment, the cover layer is harder than the intermediate layer. In this design, the ratio of Shore D hardness of the cover layer to the intermediate layer is about 1.33 or less, preferably from about 1.14 or less.

When a two-piece ball is constructed, the core may be softer than the outer cover. For example, the core hardness may range from about 30 Shore D to about 50 Shore D, and the cover hardness may be from about 50 Shore D to about 80 Shore D. In this type of construction, the ratio between the cover hardness and the core hardness is preferably about 1.75 or less. In another embodiment, the ratio is about 1.55 or less. Depending on the materials, for example, if a composition of the invention is acid-functionalized wherein the acid groups are at least partially neutralized, the hardness ratio of the cover to core is preferably about 1.25 or less.

C. Compression

Compression values are dependent on the diameter of the component being measured. The Atti compression of the core, or portion of the core, of golf balls prepared according to the invention is preferably less than about 80, more preferably less than about 75. In another embodiment, the core compression is from about 40 to about 80, preferably from about 50 to about 70. For example, the core compression may be about 40 to about 50. In yet another embodiment, the core compression is preferably below about 50, and more preferably below about 25. In an alternative, low compression embodiment, the core has a compression less than about 20, more preferably less than about 10, and most preferably, 0. As known to those of ordinary skill in the art, however, the cores generated according to the present invention may be below the measurement of the Atti Compression Gauge.

In one embodiment, golf balls of the invention preferably have an Atti compression of about 55 or greater, preferably from about 60 to about 120. In another embodiment, the Atti compression of the golf balls of the invention is at least about 40, preferably from about 50 to 120, and more preferably from about 60 to 100. In yet another embodiment, the compression of the golf balls of the invention is about 75 or greater and about 95 or less. For example, a preferred golf ball of the invention may have a compression from about 80 to about 95, preferably about 80 to about 90. In one embodiment, the compression of a golf ball of the invention is about 87.

D. Initial Velocity and COR

There is currently no USGA limit on the coefficient of restitution (COR) of a golf ball, but current U.S.G.A. rules state that the initial velocity of the golf ball cannot exceed 250±5 feet/second (ft/s) under U.S.G.A. established testing conditions. It is preferred that golf balls of the invention satisfy initial velocity requirements of the U.S.G.A. Thus, in one embodiment, the initial velocity is about 245 ft/s or greater and about 255 ft/s or less. In another embodiment, the initial velocity is about 250 ft/s or greater, but still complies with the U.S.G.A. initial velocity requirements. In one embodiment, the initial velocity is about 253 ft/s to about 254 ft/s. In yet another embodiment, the initial velocity is about 255 ft/s. While the current rules on initial velocity require that golf ball manufacturers stay within the limits stated above, one of ordinary skill in the art would appreciate that golf balls of the invention may be designed with initial velocities outside of this range. For example, a golf ball of the invention may be designed to have an initial velocity of about 220 ft/s or greater, preferably about 225 ft/s or greater.

As a result, of the initial velocity limitation set forth by the USGA, it may be desirable to maximize COR without violating the 255 ft/s limit. The COR of a ball is measured by taking the ratio of the outbound or rebound velocity to the incoming or inbound velocity. In a one-piece solid golf ball, the COR will depend on a variety of characteristics of the ball, including its composition and hardness. For a given composition, COR will generally increase as hardness is increased. In some two-piece solid golf balls, e.g., those having a core and a cover, the cover may be designed to produce a gain in COR over that of the core. When the contribution of the core to COR is substantial, a lesser contribution is required from the cover. Moreover, core compositions having a high COR may have covers around them that slow the ball or deaden its response to club impact. Similarly, when the cover contributes substantially to high COR of the ball, a lesser contribution is needed from the core.

The present invention contemplates golf balls having CORs from about 0.700 to about 0.850 at an inbound velocity of about 125 ft/sec. In one embodiment, the COR is about 0.750 or greater, preferably about 0.780 or greater. In another embodiment, the ball has a COR of about 0.800 or greater. In yet another embodiment, the COR of the balls of the invention is about 0.800 to about 0.815.

In addition, the inner ball preferably has a COR of about 0.780 or more. In one embodiment, the COR is about 0.790 or greater.

E. Spin Rate

As known to those of ordinary skill in the art, the spin rate of a golf ball will vary depending on the golf ball construction. In a multilayer ball, e.g., a core, an intermediate layer, and a cover, wherein the cover is formed from the compositions of the invention, the spin rate of the ball off a driver ("driver spin rate") may be about 2700 rpm or greater. In one embodiment, the driver spin rate is about 2800 rpm to about 3500 rpm. In another embodiment, the driver spin rate is about 2900 rpm to about 3400 rpm. In still another embodiment, the driver spin rate may be less than about 2700 rpm.

Two-piece balls made according to the invention may also have driver spin rates of 2700 rpm and greater. In one embodiment, the driver spin rate is about 2700 rpm to about 3300 rpm. Wound balls made according to the invention preferably have similar spin rates.

Methods of determining the spin rate should be well understood by those of ordinary skill in the art. Examples of methods for determining the spin rate are disclosed in U.S. Pat. Nos. 6,500,073, 6,488,591, 6,286,364, and 6,241,622, which are incorporated by reference herein in their entirety.

F. Flexural Modulus

Accordingly, it is preferable that the golf balls of the present invention have an intermediate layer with a flexural modulus, as measured by ASTM D6272-$O_2$, of about 500 psi to about 500,000 psi. More preferably, the flexural modulus of the intermediate layer is about 1,000 psi to about 250,000 psi. Most preferably, the flexural modulus of the intermediate layer is about 2,000 psi to about 200,000 psi.

The flexural modulus of the cover layer is preferably about 2,000 psi or greater, and more preferably about 5,000 psi or greater. In one embodiment, the flexural modulus of the cover is from about 10,000 psi to about 150,000 psi. More preferably, the flexural modulus of the cover layer is about 15,000 psi to about 120,000 psi. Most preferably, the flexural modulus of the cover layer is about 18,000 psi to about 110,000 psi. In another embodiment, the flexural modulus of the cover layer is about 100,000 psi or less, preferably about 80,000 or less, and more preferably about 70,000 psi or less. For example, the flexural modulus of the cover layer may be from about 10,000 psi to about 70,000 psi, from about 12,000 psi to about 60,000 psi, or from about 14,000 psi to about 50,000 psi.

In one embodiment, when the cover layer has a hardness of about 50 Shore D to about 60 Shore D, the cover layer preferably has a flexural modulus of about 55,000 psi to about 65,000 psi.

In one embodiment, the ratio of the flexural modulus of the intermediate layer to the cover layer is about 0.003 to about 50. In another embodiment, the ratio of the flexural modulus of the intermediate layer to the cover layer is about 0.006 to about 4.5. In yet another embodiment, the ratio of the flexural modulus of the intermediate layer to the cover layer is about 0.11 to about 4.5.

In one embodiment, the compositions of the invention are used in a golf ball with multiple cover layers having essentially the same hardness, but differences in flexural moduli. In this aspect of the invention, the difference between the flexural moduli of the two cover layers is preferably about 5,000 psi or less. In another embodiment, the difference in flexural moduli is about 500 psi or greater. In yet another embodiment, the difference in the flexural moduli between the two cover layers, wherein at least one is reinforced is about 500 psi to about 10,000 psi, preferably from about 500 psi to about 5,000 psi. In one embodiment, the difference in flexural moduli between the two cover layers formed of unreinforced or unmodified materials is about 1,000 psi to about 2,500 psi.

G. Specific Gravity

The specific gravity, as measured by ASTM D297, of a cover or intermediate layer is preferably at least about 0.7. In one embodiment, the specific gravity of the intermediate layer or cover is about 0.8 or greater, preferably about 0.9 or greater. For example, in one embodiment, the golf ball has an intermediate layer with a specific gravity of about 0.9 or greater and a cover having a specific gravity of about 0.95 or greater. In another embodiment, the intermediate layer or cover has a specific gravity of about 1.00 or greater. In yet another embodiment, the specific gravity of the intermediate layer or cover is about 1.05 or greater, preferably about 1.10 or greater.

The core may have a specific gravity of about 1.00 or greater, preferably 1.05 or greater. For example, a golf ball of the invention may have a core with a specific gravity of about 1.10 or greater and a cover with a specific gravity of about 0.95 or greater.

G. Density

The density of a core is preferably about 0.6 g/cm3 to about 10 g/cm3. In one embodiment, the density of the core is about 0.9 g/cm3 to about 8 g/cm3. In another embodiment, the core density is about 2 g/cm3 to about 6 g/cm3. If present, the outer core preferably has a density of about 0.6 g/cm3 to about 5 g/cm3, more preferably about 0.9 g/cm3 to about 3 g/cm3. Likewise, the density of the inner cover layer is preferably about 0.6 g/cm3 to about 5 g/cm3, more preferably about 0.9 g/cm3 to about 3 g/cm3. The outer cover layer of a golf ball of the invention preferably has a density of about 0.9 g/cm3 to about 1.55 g/cm3, more preferably about 0.95 g/cm3 to about 1.2 g/cm3.

H. Adhesion Strength

With respect to layer to layer adhesion, the adhesions strength (or peel strength) of the compositions of the invention is preferably about 5 lbf/in or greater. In one embodiment, the adhesion strength is about 25 lbf/in or less. For example, the adhesion strength is preferably about 10 lbf/in or more and about 20 lbf/in or less. In another embodiment, the adhesion strength is about 20 lbf/in or greater, preferably about 24 lbf/in or greater. In yet another embodiment, the adhesion strength is about 26 lbf/in or greater. In still another embodiment, the adhesion strength is about 20 lbf/in to about 30 lbf/in.

Skilled artisans are aware of methods to determine adhesion strength. For example, when testing adhesion strength of paint, cross-hatch tests and repeated ball impact tests are useful to determine the adhesion strength of a particular layer of a golf ball. The cross-hatch test consists of cutting the material into small pieces in mutually perpendicular directions, applying a piece of adhesive cellophane tape over the material, rapidly pulling off the tape, and counting the number of pieces removed. The repeated impact test consists of subjecting the finished golf ball to impact repeatedly and visually examining the coating film for peeling from the golf ball. Examples of these methods are provided in U.S. Pat. No. 5,316,730, which is incorporated by reference herein. The peel strength is measured using, a MTS Sintech® 30/G) or MTS Sintech® 5/G) mechanical test equipment to pull a 0.5-inch-wide section of a golf ball layer apart from the layer/core it is adheared to. The MTS includes a load cell of 100 N and a crosshead speed of 1.0 in/min. The golf ball is rotately secured in a manner such that a free rotation remains about a single axis perpendicular to the pull direction. Golf ball movement in other axes is not permitted.

I. Dynamic Stiffness

The dynamic stiffness is similar in some ways to dynamic modulus. Dynamic stiffness is dependent on probe geometry as described herein, whereas dynamic modulus is a unique material property, independent of geometry. The dynamic stiffness measurement has the unique attribute of enabling quantitative measurement of dynamic modulus and exact measurement of loss tangent at discrete points within a sample article. A polybutadiene reaction product usable in the present invention preferably has a loss tangent below about 0.1 at −50° C., and more preferably below about 0.07 at −50° C.

All of the numerical ranges, amounts, values and percentages such as those for amounts of materials, times and temperatures of reaction, ratios of amounts, values for molecular weight (whether number average molecular weight ("Mn") or weight average molecular weight ("Mw"), and others in the following portion of the specification may be read as if prefaced by the word "about" even though the term "about" may not expressly appear with the value, amount or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

The molding process and composition of golf ball portions typically results in a gradient of material properties. Methods employed in the prior art generally exploit hardness to quantify these gradients. Hardness is a qualitative measure of static modulus and does not represent the modulus of the material at the deformation rates associated with golf ball use, i.e., impact by a club. As is well known to one skilled in the art of polymer science, the time-temperature superposition principle may be used to emulate alternative deformation rates. For golf ball portions including polybutadiene, a 1-Hz oscillation at temperatures between 0° C. and −50° C. are believed to be qualitatively equivalent to golf ball impact rates. Therefore, measurement of loss tangent and dynamic stiffness at 0° C. to −50° C. may be used to accurately anticipate golf ball performance, preferably at temperatures between about −20° C. and −50° C. Additionally, the unvulcanized rubber, such as polybutadiene, in golf balls prepared according to the invention typically has a Mooney viscosity of between about 40 and about 80, more preferably, between about 45 and about 60, and most preferably, between about 45 and about 55. Mooney viscosity is typically measured according to ASTM D-1646.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. For example, while golf balls and golf ball components are used as examples for articles incorporating the compositions of the invention, other golf equipment may be formed from the compositions of the invention. In one embodiment, at least a portion of a golf shoe is formed from the composition of the invention. In another embodiment, the composition of the invention is used to form at least a portion of a golf club, e.g., a putter insert. Such modifications are also intended to fall within the scope of the appended claims. Therefore, it is intended that the appended claims cover all such modifications and embodiments that fall within the true spirit and scope of the present invention.

All patents and patent applications cited in the foregoing text are incorporated expressly herein by reference in their entirety.

What is claimed is:

1. A golf ball comprising at least one core or layer, said core or layer comprising:
   a block copolymer ionomer comprising:
      a block of a saturated rubber compound comprising polyisobutylene and at least one ionomeric block connected to the block of saturated rubber compound.

2. The golf ball according to claim 1 wherein the at least one ionomeric block comprises an anionomer.

3. The golf ball according to claim 2 wherein the anionomer comprises an acrylic acid salt.

4. The golf ball according to claim 3 wherein the acrylic acid salt comprises a poly(methacrylic acid) salt.

5. The golf ball according to claim 4 wherein the block copolymer ionomer is a polyisobutylene-block-poly(methacrylic acid) salt.

6. The golf ball according to claim 1 wherein the ionomeric block comprises cationomers.

7. The golf ball according to claim 6 wherein the cationomers comprise tertiary amines.

8. The golf ball according to claim 7 wherein the tertiary amines comprise quaternized poly (2-dimethylamino ethyl methacrylate).

9. The golf ball according to claim 8 wherein the block copolymer ionomer is polyisobutylene-block-quaternized poly (2-dimethylamino ethyl methacrylate).

10. The golf ball according to claim 1 wherein said layer is a cover layer.

11. A golf ball comprising at least one layer, said layer comprising a star polymer comprising:
   a star polymer core; and
   at least three arms;
   wherein each of the at least three arms comprises a block comprising an isobutylene monomer and a block of an anionomer.

12. The golf ball according to claim 11 wherein the anionomer comprises an acrylic acid salt.

13. The golf ball according to claim 12 wherein the acrylic acid salt is a poly (methacrylic acid) salt.

14. A golf ball comprising at least one layer, said layer comprising a star polymer comprising:
- a star polymer core, and;
- at least three arms;
- wherein each of the at least three arms comprises a block of a saturated rubber compound and a block of a cationomer connected to the block of saturated rubber compound.

15. The block copolymer ionomer according to claim 14 wherein the cationomer comprises amines.

16. The golf ball according to claim 15 wherein the amines comprise quaternized poly (2-dimethylamino ethyl methacrylate).

17. The golf ball according to claim 14 wherein the saturated rubber compound comprises polyisobutylene.

* * * * *